US012580914B2

(12) United States Patent

Zuo et al.

(10) Patent No.: US 12,580,914 B2

(45) Date of Patent: *Mar. 17, 2026

(54) CALL PROCESSING METHOD, RELATED DEVICE, AND COMMUNICATIONS SYSTEM

(71) Applicant: Huawei Technologies Co., Ltd., Shenzhen (CN)

(72) Inventors: Jun Zuo, Dongguan (CN); Hongda Lin, Dongguan (CN); Jinzhou Ye, Shenzhen (CN); Xiaolong Guo, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 328 days.

This patent is subject to a terminal disclaimer.

(21) Appl. No.: 18/347,092

(22) Filed: Jul. 5, 2023

(65) Prior Publication Data

US 2023/0353569 A1 Nov. 2, 2023

Related U.S. Application Data

(63) Continuation of application No. PCT/CN2021/070520, filed on Jan. 6, 2021.

(51) Int. Cl.
*H04W 12/69* (2021.01)
*G06F 21/44* (2013.01)
(Continued)

(52) U.S. Cl.
CPC ...... *H04L 63/0884* (2013.01); *H04L 63/0823* (2013.01); *H04L 63/166* (2013.01); *H04M 3/42042* (2013.01)

(58) Field of Classification Search
CPC ............. H04L 63/0884; H04L 63/0823; H04L 63/166; H04M 3/42042; G06F 21/44; H04W 12/069
See application file for complete search history.

(56) References Cited

U.S. PATENT DOCUMENTS

| | | | | |
|---|---|---|---|---|
| 2010/0202439 | A1* | 8/2010 | Rosenberg | ............ H04M 3/436 370/352 |
| 2020/0221302 | A1* | 7/2020 | Filart | .................. H04L 65/1104 |
| 2020/0336314 | A1* | 10/2020 | Barakat | ............... H04L 65/1104 |

OTHER PUBLICATIONS

3GPP TS 23.228 V16.5.0 (Sep. 2020), 3rd Generation Partnership Project; Technical Specification Group Services and System Aspects; IP Multimedia Subsystem (IMS); Stage 2 (Release 16), total 349 pages.

(Continued)

*Primary Examiner* — Amie C. Lin

(74) *Attorney, Agent, or Firm* — Slater Matsil, LLP

(57) ABSTRACT

A method includes: a network authentication server receiving a call request message from a calling device, where the call request message includes a first user identity of a calling user and a call authentication identifier; the network authentication server sending a call authentication request to an enterprise authentication server corresponding to the first user identity, where the call authentication request includes the call authentication identifier; the network authentication server receiving a call authentication success indication from the enterprise authentication server, where the call authentication success indication indicates that authentication succeeds; and the network authentication server sending target data to a called device, where the target data includes identity information of the calling user and/or information of an enterprise to which the calling user belongs.

18 Claims, 10 Drawing Sheets

(51) Int. Cl.
  *H04L 9/40* (2022.01)
  *H04M 3/42* (2006.01)

(56) References Cited

OTHER PUBLICATIONS

3GPP TS 24.229 V16.7.0 (Sep. 2020), 3rd Generation Partnership Project; Technical Specification Group Core Network and Terminals; IP multimedia call control protocol based on Session Initiation Protocol (SIP) and Session Description Protocol (SDP); Stage 3 (Release 16), total 1027 pages.

3GPP TS 26.114 V16.7.0 (Sep. 2020), 3rd Generation Partnership Project; Technical Specification Group Services and System Aspects; IP Multimedia Subsystem (IMS); Multimedia Telephony; Media handling and interaction (Release 16), total 445 pages.

3GPP TS 29.562 V16.2.0 (Sep. 2020), 3rd Generation Partnership Project; Technical Specification Group Core Network and Terminals; 5G System; Home Subscriber Server (HSS) Services for interworking with the IP Multimedia Subsystem (IMS); Stage 3 (Release 16), total 189 pages.

3GPP TS 33.203 V16.1.0(Sep. 2020), 3rd Generation Partnership Project; Technical Specification Group Services and System Aspects; 3G security; Access security for IP-based services (Release 16), total 146 pages.

D. Hardt, Ed., The OAuth 2.0 Authorization Framework, RFC 6749, Oct. 2012, total 76 pages.

* cited by examiner

CALL PROCESSING METHOD, RELATED DEVICE, AND COMMUNICATIONS SYSTEM

CROSS-REFERENCE TO RELATED APPLICATIONS

This application is a continuation of International Application No. PCT/CN2021/070520, filed on Jan. 6, 2021, the disclosure of which is hereby incorporated by reference in its entirety.

TECHNICAL FIELD

This application relates to the communications field, and in particular, to a call processing method, a related device, and a communications system.

BACKGROUND

An IP multimedia subsystem (IMS) is a new multimedia service form, and can meet requirements of more-novel and more-diversified multimedia services. The IMS is an important solution to mobile and fixed network convergence, and introduces differentiated services such as convergence of a voice, data, and a video.

Based on the IMS, when a calling user inside an enterprise calls a called user outside the enterprise, the calling user may send information related to the calling user to the called user, but trustworthiness of the information related to the calling user is low.

SUMMARY

According to a first aspect, an embodiment of the present invention provides a call processing method, a related device, and a communications system. A trustworthy security association between an operator network, an enterprise, and a calling user can be established, and therefore, it can be ensured that information of a call business card displayed when a called device rings is trustworthy.

According to a first aspect, an embodiment of the present invention provides a call processing method. The method includes: a network authentication server receives a call request message from a calling device, where the calling device is a device used by a calling user, and the call request message includes a first user identity of the calling user and a call authentication identifier; the network authentication server sends a call authentication request to an enterprise authentication server corresponding to the first user identity, where the call authentication request includes the call authentication identifier; the network authentication server receives a call authentication success indication from the enterprise authentication server, where the call authentication success indication indicates that authentication succeeds; and the network authentication server sends target data to a called device, where the called device is a device used by a called user, and the target data includes identity information of the calling user and/or information of an enterprise to which the calling user belongs.

It can be learned that the target data sent by the network authentication server to the called device comes from the enterprise authentication server and/or enterprise account opening data instead of the calling user. In this way, trustworthiness of the target data sent to the called device can be effectively ensured. In addition, the calling user can use a service of calling the called user provided by the operator network without opening an account in the operator network, thereby avoiding problems of slow time to market of the calling user and exposure of privacy information of the calling user that occur when the calling user opens an account in the operator network.

In an optional implementation, the call authentication success indication indicates that call authentication succeeds.

According to the first aspect, in an optional implementation, the call authentication success indication includes a second user identity, and that the network authentication server sends target data to a called device includes: the network authentication server determines that the first user identity is the same as the second user identity, that is, determines that the network authentication server is authenticated, and sends the target data to the called device.

It can be learned that the network authentication server sends the target data to the called device only when determining that the call authentication identifier is authenticated and determining that the first user identity and the second user identity are the same. Therefore, the network authentication server can execute, for the calling user that is authenticated, a process of calling the called user.

According to the first aspect, in an optional implementation, that the network authentication server sends target data to a called device includes: the network authentication server obtains the target data from the enterprise authentication server, and sends the target data to the called device.

It can be learned that the target data in this aspect comes from the enterprise authentication server instead of the calling user. In this way, trustworthiness of the target data sent to the called device can be effectively ensured.

According to the first aspect, in an optional implementation, that the network authentication server sends target data to a called device includes: the network authentication server sends the call request message to the called device, where the call request message includes the target data.

According to the first aspect, in an optional implementation, that the network authentication server sends target data to a called device includes: the network authentication server sends the target data to the called device via a media plane device.

According to the first aspect, in an optional implementation, that the network authentication server sends target data to a called device includes: the network authentication server obtains the target data from the enterprise authentication server, typesets the target data, and sends the typeset target data to the called device.

According to the first aspect, in an optional implementation, that the network authentication server sends target data to a called device includes: the network authentication server obtains the target data from the enterprise authentication server; and the network authentication server sends notification information to the media plane device, where the notification information indicates the media plane device or an application server to typeset the target data, and send the typeset target data to the called device.

According to the first aspect, in an optional implementation, before that a network authentication server receives a call request message from a calling device, the method further includes: The network authentication server receives a registration request message from the calling device, where the registration request message includes the first user identity and a registration authentication identifier; the network authentication server sends an authentication request to the enterprise authentication server corresponding to the first user identity, where the authentication request includes the registration authentication identifier; the network authentication server receives a registration authentication success indication from the enterprise authentication server, where the registration authentication success indication indicates that authentication succeeds; and the network authentication server obtains initial data, where the initial data includes the identity information of the calling user and/or the information of the enterprise to which the calling user belongs.

It can be learned that when a calling user inside an enterprise makes a call to a called user outside the enterprise, a procedure of registration processing is first executed. Based on the procedure of registration processing, when the calling user subsequently makes a call to the called user, an operator network can directly send initial data to the called user, and therefore, the initial data does not need to be generated during the call. In this case, a call processing latency is shortened, and call efficiency is improved. In addition, a process of performing authentication on the calling user by the enterprise as indicated by the trustworthy security association can be created.

In an optional implementation, the registration authentication success indication indicates that registration authentication succeeds.

According to the first aspect, in an optional implementation, the registration authentication success indication includes a third user identity, and the method further includes: The network authentication server determines that authentication succeeds when determining that the first user identity is the same as the third user identity. It can be learned that the network authentication server obtains the initial data only when determining that authentication succeeds and determining that the first user identity is the same as the third user identity. In this case, when the calling user subsequently makes a call to the called user, the operator network can directly send the initial data to the called device, and therefore, the initial data does not need to be generated during the call. In this case, a call processing latency is shortened, and call efficiency is improved.

According to the first aspect, in an optional implementation, that the network authentication server sends target data to a called device includes: The network authentication server determines that the target data is the initial data if the network authentication server determines that the call authentication identifier is the same as the registration authentication identifier.

It can be learned that, if the network authentication device determines that the call authentication identifier is the same as the registration authentication identifier, the network authentication device can send the initial data to the called device, and the initial data does not need to be generated during the call. In this case, a call processing latency can be shortened, and call efficiency can be improved.

According to the first aspect, in an optional implementation, that the network authentication server sends target data to a called device includes: The network authentication server receives the target data from the enterprise authentication server if the network authentication server determines that the call authentication identifier is different from the registration authentication identifier, where the target data and the initial data are different from each other.

It can be learned that, if the network authentication device determines that the call authentication identifier is different from the registration authentication identifier, the network authentication device needs to re-obtain the target data from the enterprise authentication server, and then sends the target data to the called device.

According to the first aspect, in an optional implementation, the method further includes: The network authentication server receives a first certificate authority CA certificate corresponding to a device certificate of the enterprise authentication server; and the network authentication server creates, by using the first CA certificate, a transport layer security TLS protocol secure connection between the network authentication server and the enterprise authentication server, and the network authentication server performs data exchange with the enterprise authentication server through the TLS secure connection.

It can be learned that the TLS secure connection is created between the network authentication server and the enterprise authentication server, so that security of a message exchanged between the network authentication server and the enterprise authentication server is effectively ensured, and security of a process of executing the call processing method in this aspect is improved.

According to a second aspect, an embodiment of the present invention provides a call processing method. The method includes: An enterprise authentication server receives a call authentication request from a network authentication server, where the call authentication request includes a call authentication identifier; and if the enterprise authentication server determines, based on the call authentication identifier, that authentication succeeds, the enterprise authentication server sends a call authentication success indication and target data to the network authentication server, where the call authentication success indication indicates that call authentication identifier is authenticated, the target data includes identity information of a calling user and/or information of an enterprise to which the calling user belongs.

For descriptions of beneficial effects of this aspect, refer to the first aspect. Details are not described again.

According to the second aspect, in an optional implementation, before that an enterprise authentication server receives a call authentication request from a network authentication server, the method further includes: The enterprise authentication server receives an authentication request from the network authentication server, where the authentication request includes a registration authentication identifier; and if the enterprise authentication server determines, based on the registration authentication identifier, that authentication succeeds, the enterprise authentication server sends a registration authentication success indication and initial data to the network authentication server, where the initial data includes the identity information of the calling user and/or the information of the enterprise to which the calling user belongs.

According to the second aspect, in an optional implementation, the enterprise authentication server sends the target data to the network authentication server if the call authentication identifier is different from the registration authentication identifier, where the target data and the initial data are different from each other.

According to the second aspect, in an optional implementation, the method further includes: The enterprise authentication server receives a second certificate authority CA certificate corresponding to a device certificate of the network authentication server; and the enterprise authentication server creates, by using the second CA certificate, a transport layer security TLS protocol secure connection between the enterprise authentication server and the network authentication server, and the enterprise authentication server performs data exchange with the network authentication server through the TLS secure connection.

According to the second aspect, in an optional implementation, after that an enterprise authentication server receives a call authentication request from a network authentication server, the method further includes: if the enterprise authentication server determines, based on the call authentication identifier, that authentication fails, the enterprise authentication server sends authentication invalidity notification information to the network authentication server, where the authentication invalidity notification information indicates that authentication fails.

According to the second aspect, in an optional implementation, before that an enterprise authentication server receives a call authentication request from a network authentication server, the method further includes: the enterprise authentication server receives a first user identity from a calling device, where the first user identity is an identity of the calling user; and the enterprise authentication server sends, to the calling device, the call authentication identifier corresponding to the first user identity.

According to the second aspect, in an optional implementation, before that the enterprise authentication server receives an authentication request from the network authentication server, the method further includes: the enterprise authentication server receives a first user identity from a calling device, where the first user identity is an identity of the calling user; and the enterprise authentication server sends, to the calling device, the registration authentication identifier corresponding to the first user identity.

According to a third aspect, an embodiment of the present invention provides a call processing method. The method includes: a calling device obtains a registration authentication identifier of a calling user from an enterprise authentication server, the calling device sends a registration request to an IMS network, and the calling device receives an authentication success response message sent by the IMS network, where the registration request includes a first user identity of the calling user and the registration authentication identifier.

For descriptions of beneficial effects of this aspect, refer to the first aspect. Details are not described again.

According to the third aspect, in an optional implementation, before that a calling device obtains a registration authentication identifier of a calling user from an enterprise authentication server, the method further includes: the calling device sends a login request to the enterprise authentication server, where the login request includes the first user identity.

According to a fourth aspect, an embodiment of the present invention provides a call processing method. The method includes: a calling device sends a call request message to an IMS network, where the call request message includes a first user identity of a calling user that uses the calling device and a call authentication identifier; the calling device receives a call response message from a called device, where the called device is a device used by a called user; and the calling device answers a call with the called device based on the call response message.

According to the fourth aspect, the present invention provides a call processing method. In the method, an application server receives, from a network authentication server, identity information of the calling user and/or information of an enterprise to which the calling user belongs; and the application server obtains a call business card, where the call business card is a call business card including the identity information of the calling user and/or the information of the enterprise to which the calling user belongs.

According to the fourth aspect, in an optional implementation, that the application server obtains a call business card includes: the application server receives the identity information of the calling user, the information of the enterprise to which the calling user belongs, and a typesetting manner of the call business card from the network authentication server; and the application server forwards the identity information of the calling user, the information of the enterprise to which the calling user belongs, and the typesetting manner of the calling business card to a media plane device, where the media plane device is configured to typeset the identity information of the calling user and the information of the enterprise to which the calling user belongs in the typesetting manner of the call business card, to obtain an initial call business card.

According to the fourth aspect, in an optional implementation, the obtaining, by an application server, a calling card includes: receiving, by the application server, the calling card from the network authentication server.

According to a fifth aspect, an embodiment of the present invention provides a network authentication server including a processor and a memory that are coupled to each other. The memory stores computer program code, and the processor invokes and executes the computer program code in the memory, so that the processor performs the method according to any one of the implementations of the first aspect.

According to a sixth aspect, an embodiment of the present invention provides an enterprise authentication server including a processor and a memory that are coupled to each other. The memory stores computer program code, and the processor invokes and executes the computer program code in the memory, so that the processor performs the method according to any one of the implementations of the second aspect.

According to a seventh aspect, an embodiment of the present invention provides a calling device including a processor and a memory that are coupled to each other. The memory stores computer program code, and the processor invokes and executes the computer program code in the memory, so that the processor performs the method according to any one of the implementations of the third aspect.

According to an eighth aspect, an embodiment of the present invention provides an application server including a processor and a memory that are coupled to each other. The memory stores computer program code, and the processor invokes and executes the computer program code in the memory, so that the processor performs the method according to any one of the implementations of the fourth aspect.

According to a ninth aspect, an embodiment of the present invention provides a communications system that includes a network authentication server and an enterprise authentication server. The network authentication server is described in the fifth aspect. The enterprise authentication server is described in the sixth aspect.

According to the ninth aspect, in an optional implementation, the communications system further includes a calling device and an application server. The calling device is described in the seventh aspect. The application server is described in the eighth aspect.

DETAILED DESCRIPTION OF ILLUSTRATIVE EMBODIMENTS

Figure 1:
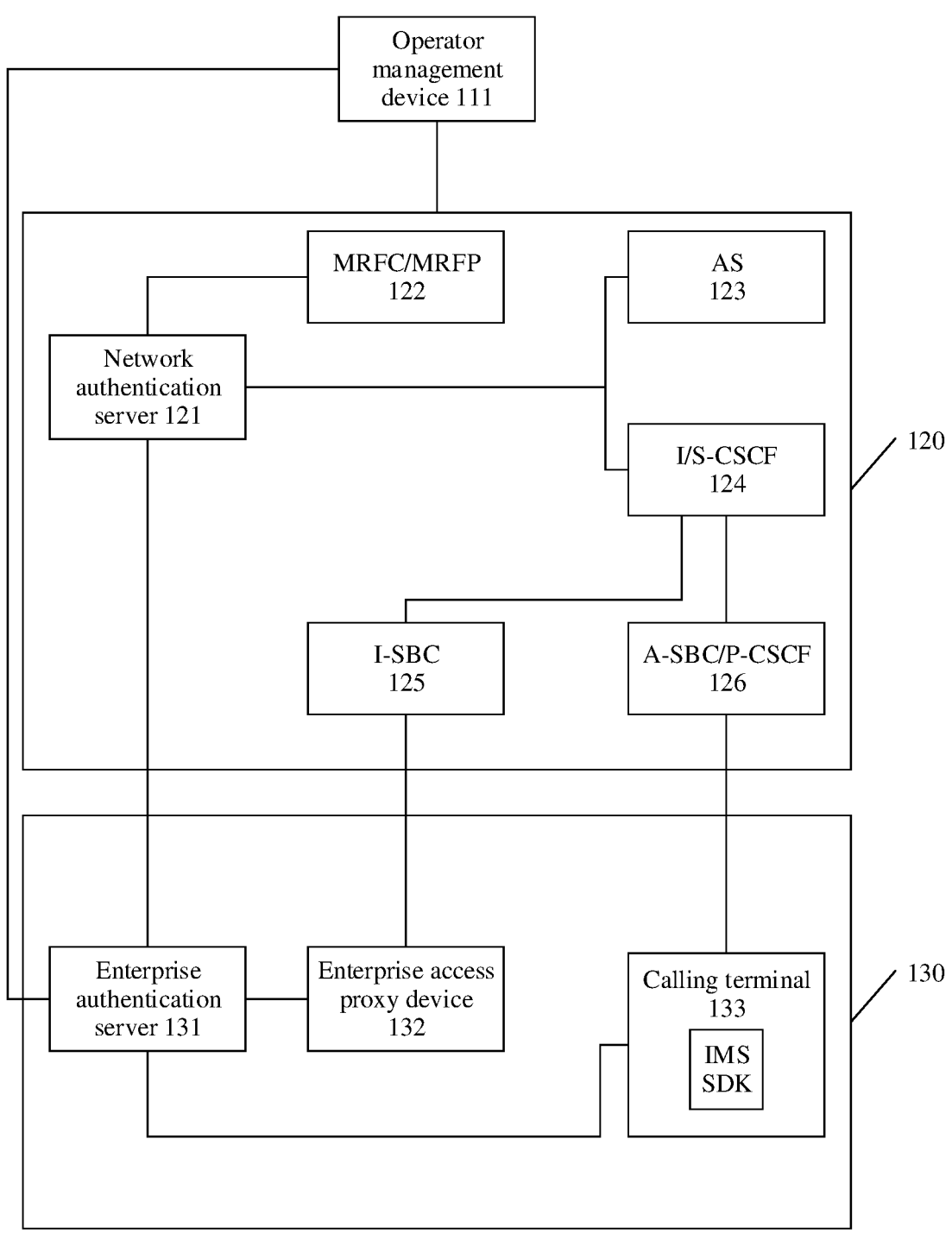
FIG. 1 is a schematic diagram of a structure of a communications system according to an embodiment of this application.

The following clearly and completely describes technical solutions in embodiments of the present invention with reference to drawings in embodiments of the present invention. It is clear that the described embodiments are merely a part rather than all of embodiments of the present invention. All other embodiments obtained by a person skilled in the art based on embodiments of the present invention without creative efforts shall fall within the protection scope of the present invention.

The term "and/or" in this application describes only an association relationship for describing associated objects and represents that three relationships may exist. For example, A and/or B may represent the following three cases: Only A exists, both A and B exist, and only B exists.

In the specification, claims, and accompanying drawings of this application, the terms "first", "second" and the like are intended to distinguish between similar objects but do not indicate a particular order or a sequence. It should be understood that the terms used in this way are interchangeable in proper circumstances, so that embodiments described herein can be implemented in an order other than the order illustrated or described herein.

This application provides a call processing method. To better understand the call processing method provided in this application, the following first describes, with reference to FIG. 1, a structure of a communications system to which the method in this application is applied.

The communications system in this embodiment includes an operator management device 111, an operator network 120, and an enterprise network 130 that are sequentially connected. A specific network type of the operator network 120 is not limited in this embodiment. For example, the network type of the operator network 120 is an IMS, a 3rd generation partnership project (3GPP), a China communications standards association (CCSA), or any network architecture that emerges in the future. In the following embodiments of this application, an example in which the operator network 120 is an IMS is used.

The following describes network elements included in the operator network 120. It should be noted that description of a type of each network element in this embodiment is an optional example. This is not limited.

The operator network 120 in this embodiment includes a network authentication server 121, and the network authentication server in this embodiment may also be referred to as a third-party account management (TAM) device.

The network authentication server 121 is connected to a network element 122, a network element 123, and a network element 124. A multimedia resource function controller (MRFC) and a multimedia resource function processor (MRFP) are integrated on the network element 122. The network element 123 is an application server (AS). The network element 124 has an interrogating-call session control function (I-CSCF) and a serving-call session control function (S-CSCF). The network element may be referred to as a device.

The network element 124 is connected to a network element 125 and a network element 126. The network element 125 is an interconnect-session border controller (I-SBC), and an access-session border controller (A-SBC) and a proxy-call session control function (P-CSCF) are integrated on the network element 126.

The following describes a structure of the enterprise network 130 in this embodiment. It should be noted that description of the enterprise network 130 in this embodiment is an optional example. This is not limited.

The enterprise network 130 specifically includes an enterprise authentication server 131, an enterprise access proxy device 132, and a calling terminal 133. The enterprise authentication server 131 is separately connected to the network authentication server 121, the enterprise access proxy device 132, and the calling terminal 133. The enterprise access proxy device 132 is connected to the network element 125 or the network element 126, and the calling terminal 133 is connected to the network element 126.

The calling terminal 133 may be either an intelligent terminal or a computer. The calling terminal has a built-in IMS software development kit (SDK), to implement a call processing procedure in this application.

Based on the communications system shown in FIG. 1, the following describes embodiments of the call processing method performed by the communications system. To better understand embodiments in this application, objectives to be achieved by call processing solutions in this application are first described in an overview.

According to the call processing method in this application, when making a call to a called user, a calling user may send a call business card to the called user, and the call business card may be displayed when a called device used by the called user rings. The call business card includes information related to the calling user, and/or the call business card includes information related to an enterprise to which the calling user belongs. Specific content of the call business card is not limited. In this application, it can be ensured that a trustworthy call business card is sent to the called user during the call made by the calling user to the called user, and receiving untrustworthy data by the called user can be avoided.

To ensure trustworthiness of the call business card sent by the calling user to the called user, a trustworthy security association can be created according to the call processing method in this application. In the trustworthy security association, an operator network attempts to authenticate an enterprise, and the enterprise attempts to authenticate a calling user (it can be understood that the calling user is an employee of the enterprise). It can be learned that if the enterprise is authenticated by the operator network and the calling user is authenticated by the enterprise, the operator network can trust data from the enterprise, the enterprise can trust data from the calling user, and the operator network can construct a trustworthy call business card based on the trustworthy data from the enterprise. In this way, trustworthiness of the call business card sent by the operator network to the called user is ensured.

It should be noted that the foregoing description of the objects included in the trustworthy security association is an optional example, and this is not limited. For example, alternatively, in the trustworthy security association, an operator network attempts to authenticate a third-party network, the third-party network attempts to authenticate an enterprise, and the enterprise attempts to authenticate a calling user, where the third-party network may be a network leased by the enterprise to perform a call-related service. For example, the third-party network may be a software-as-a-service (SaaS) platform. It can be learned that if the third-party network is authenticated by the operator network, the enterprise is authenticated by the third-party network, and the calling user is authenticated by the enterprise, the operator network can trust data from the third-party network, the third-party network can trust data from the enterprise, the enterprise can trust data from the calling user, and the operator network can construct a trustworthy call business card based on trustworthy data from the third-party network. In this way, trustworthiness of a call business card sent by the operator network to the called user is ensured.

The following embodiments are described by using an example in which a trustworthy security association refers to an association in which an operator network attempts to authenticate an enterprise, and the enterprise attempts to authenticate a calling user.

Embodiment 1

Figure 2:
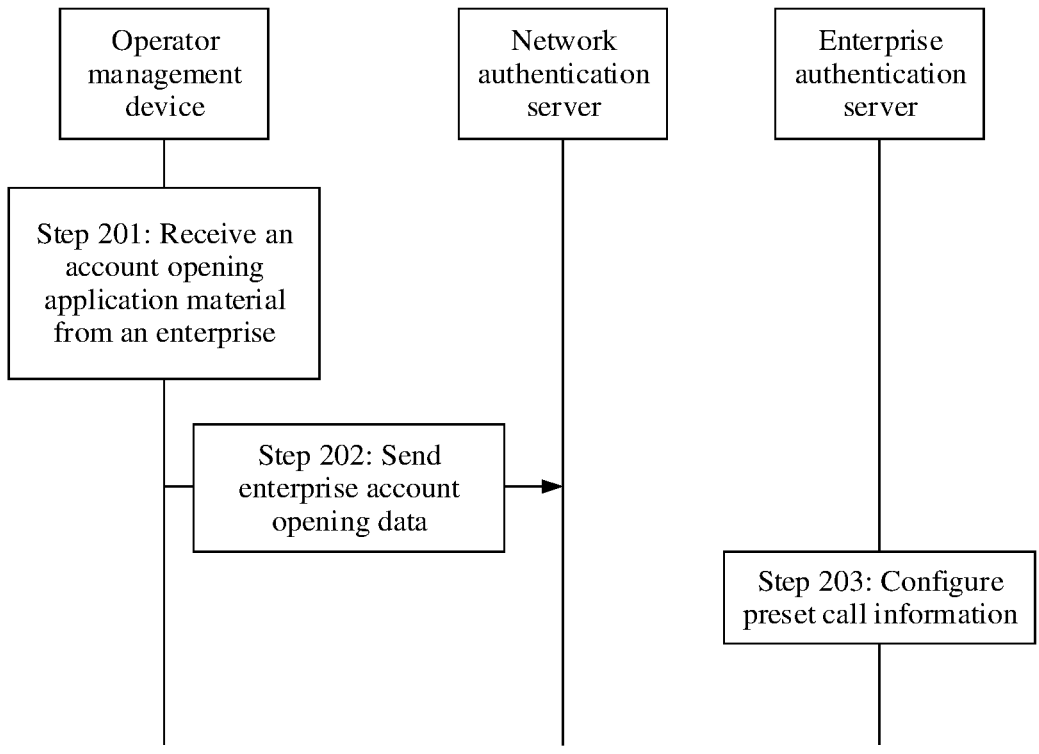
FIG. 2 is a flowchart of steps of a process in which a communications system performs account opening according to an embodiment of this application.

Based on the communications system shown in FIG. 1, a process of enterprise account opening is described in this embodiment. Based on the process of enterprise account opening in this embodiment, a process of performing authentication on an enterprise by an operator network as indicated in the trustworthy security association can be created. For details, refer to FIG. 2. FIG. 2 is a flowchart of steps of a process in which a communications system performs account opening according to an embodiment of this application.

Step 201: An operator management device receives an account opening application material from an enterprise.

In this embodiment, when the enterprise needs to send a trustworthy call business card to a called user based on the foregoing trustworthy security association, the enterprise opens an account at an operator in advance. A process of account opening refers to a process in which the enterprise applies for authentication at a business hall of the operator and submits an account opening application material of the enterprise, and a staff member of the operator authenticates the enterprise after verifying the material, and creates an enterprise account on the operator management device.

The account opening application material is not limited in this embodiment, providing the staff member of the operator can perform authentication to determine whether the enterprise is trustworthy based on the account opening application material.

Step 202: The operator management device sends enterprise account opening data to a network authentication server.

The staff member of the operator sends the enterprise account opening data to the network authentication server through the operator management device, where the enterprise account opening data may include one or more of the following terms:

a domain name authenticated by the enterprise, a first certificate authority (CA) certificate corresponding to a device certificate of the enterprise authentication server, trustworthy information of the enterprise, information of a service subscribed by the enterprise, a typesetting manner of a call business card, initial filter criteria (iFC) information of the enterprise, and the like.

The trustworthy information of the enterprise may be an enterprise name, an enterprise logo (LOGO), an enterprise-related picture, enterprise-related audio, an enterprise-related video, or the like. The information of a service subscribed by the enterprise may be a default call right of the enterprise. The default call right may be an inbound call right of an employee inside the enterprise or an outbound call right of the enterprise. The inbound call right of the enterprise refers to a right to make and receive calls between employees in the enterprise. The outbound call right of the enterprise is a right to make and receive calls between an employee inside the enterprise and a person outside the enterprise. The iFC information may be an iFC template identifier (ID) or iFC content. The iFC template ID corresponds to the iFC content. In other words, when the iFC template ID is obtained, corresponding iFC content can be obtained. The iFC content is used by the operator network to trigger a corresponding service, for example, a supplementary service, an intelligent service, a customized alerting tones service, and a customized ringing signal service.

The typesetting manner of the call business card refers to a display manner and a display position of identity information of a calling user in a generated call business card, and/or a display manner and a display position of information of an enterprise to which the calling user belongs.

The information of the enterprise to which the calling user belongs may be one or more of the following terms:

an enterprise name, an enterprise logo, an enterprise-related picture, enterprise-related audio, or enterprise-related video.

The identity information of the calling user may be one or more of the following terms:

a name of the calling user, an employee ID of the calling user, an avatar of the calling user, job position information of the calling user, and the like. The name of the calling user may be a given name of the calling user, a nickname of the calling user, or the like, and this is not specifically limited in this embodiment.

It can be learned that, based on the typesetting manner of the call business card, a display manner and a display position in the call business card of information such as the enterprise name, the enterprise logo, the enterprise-related picture, the enterprise-related audio, the enterprise-related video, the name of the calling user, the employee ID of the calling user, and the avatar of the calling user can be determined. In a process of generating the call business card, enterprise-related information and calling user-related information may be typeset in the typesetting manner of the call business card, to obtain the call business card.

Step 203: The enterprise authentication server configures preset call information.

In this embodiment, after the enterprise is authenticated by the operator network, the enterprise inputs a configuration instruction to the enterprise authentication server, and the enterprise authentication server may configure the preset call information according to the configuration instruction. The preset call information may include one or more of the following terms:

a first CA certificate corresponding to a device certificate of the network authentication server, a correspondence between a user identity (User ID) of an employee inside the enterprise and an outbound call number, and a call right of an employee in the enterprise.

For call rights of employees inside the enterprise, different call rights can be configured for different employees. For example, an employee A only has a right to make a call to and receive a call from an employee in the enterprise. For another example, an employee B has a right to make a call to and receive a call from a called user outside the enterprise. This is not limited.

Embodiment 2

Figure 3:
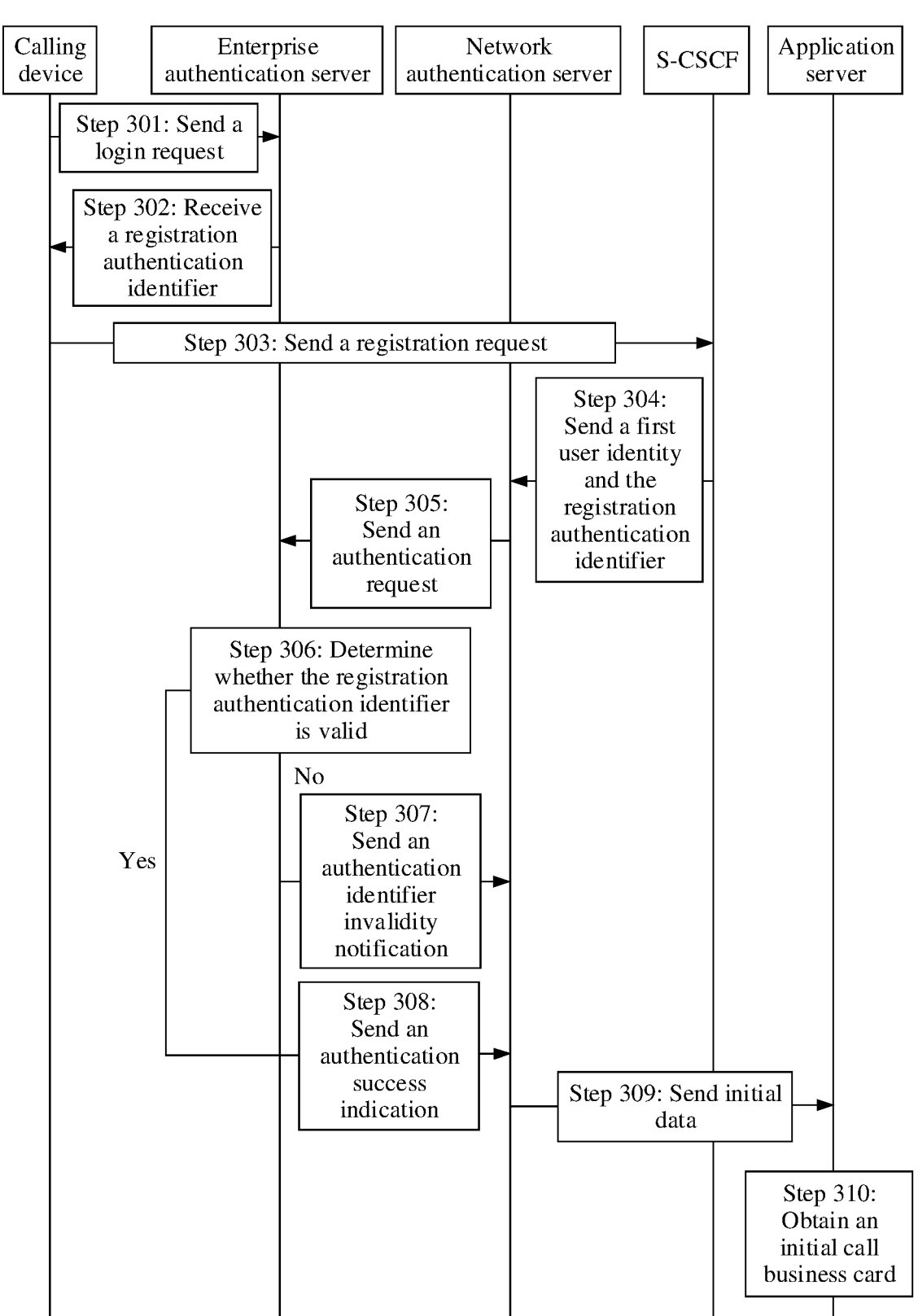
FIG. 3 is a flowchart of steps of a process in which a communications system performs registration according to an embodiment of this application.

Based on the communications system in FIG. 1, in this embodiment, when a calling user inside an enterprise calls a called user outside the enterprise, a procedure of registration processing is first implemented. According to the procedure of registration processing, initial data including identity information of the calling user and/or information of the enterprise to which the calling user belongs is typeset in a typesetting manner of a call business card, to obtain an initial call business card. In this way, when the calling user subsequently makes a call to the called user, an operator network can directly send the initial call business card to the called user, and therefore, the initial call business card does not need to be obtained during the call. In this case, an amount of information exchanged between the operator network and an enterprise authentication server during the call can be reduced, a call connection latency is shortened, and call efficiency is improved. In addition, according to the method in this embodiment, a process of performing authentication on the calling user by the enterprise as indicated by a trustworthy security association can be created. For details, refer to FIG. 3. FIG. 3 is a flowchart of steps of a process in which a communications system performs registration according to an embodiment of this application.

Step 301: A calling device sends a login request to an enterprise authentication server.

The calling device in this embodiment may be a calling terminal or an enterprise access proxy device. The calling terminal may run an enterprise application (APP), and the calling terminal can implement, by using the enterprise APP, a procedure performed by the calling device in the call processing method in this application.

When making a call to a called user outside an enterprise, a calling user may send the login request to the enterprise authentication server via the calling device, where the login request includes a first user identify of the calling user.

The first user identity (which may also be referred to as a UserID) in this embodiment may be an email address of the calling user, for example, zhangsan@xxx.com. The first user identity in this embodiment is different from an existing E.164 number in an operator network. It can be learned that the first user identity is a heterogeneous identity for the operator network. In the process in which the calling user makes a call to the called user in this application, the E.164 number is not used. Instead, the first user identity (specifically, the email address of the calling user) that is a heterogeneous identity provided in this embodiment is used.

Step 302: The calling device receives a registration authentication identifier from the enterprise authentication server.

After receiving the first user identity, the enterprise authentication server in this embodiment may allocate the registration authentication identifier to the first user identity, where the registration authentication identifier is used to register with the operator network.

The registration authentication identifier is not limited in this embodiment. An example in which the registration authentication identifier is a token (token) is used for description in this embodiment.

Step 303: The calling device sends a registration request to an S-CSCF.

The registration request includes the first user identity of the calling user and the registration authentication identifier.

The registration request in this embodiment is a session initiation protocol (SIP) register message, and the registration request needs to carry the first user identity of the calling user and the registration authentication identifier.

The following describes the SIP REGISTER message in this embodiment.

A SIP user identity format used in the SIP REGISTER message in this embodiment may be <UserID>@<fixed domain name>.

For example, the first user identity UserID in this embodiment is zhangsan@xxx.com. In this example, the SIP user identity is used to carry the first user identity, and the SIP user identity may be zhangsan@xxx.com@2b.ims.<operator>.com, where 2b.ims.<operator>.com is a fixed domain name uniformly defined by the operator network for accessing the operator network based on a heterogeneous identity (that is, a first user identity).

Because a message specified in a SIP protocol cannot include two "@", the calling device may escape "@" in the UserID (for example, zhangsan@xxx.com). The description of a specific rule of escape in this embodiment is an optional example. This is not limited. For example, the calling device escapes "@" in the UserID to "% 40".

The token in this embodiment may be in an encoding format in which binary data (Base64) is represented based on 64 printable characters, and the token may be carried in an authorization (Authorization) header field and an extended authentication manner (such as a Bearer). For example, the message format may be: Authorization: Bearer <Base64(<token>)>.

For example, the SIP REGISTER message may be specifically as follows.

SIP REGISTER: 2b.ims.<operator>.com
From/To: SIP zhangsan %40xxx.com@2b.ims.<operator>.com
Authorization: Bearer <Base64(<token>)>

The following describes a process in which the calling device sends the registration request to the S-CSCF.

As shown in FIG. 1, an example in which the calling device is a calling terminal 133 is used. The calling terminal 133 sends the registration request to the network element 126 (specifically, a P-CSCF). The P-CSCF forwards the registration request to the network element 124 (specifically, an I-CSCF). The I-CSCF forwards the registration request to the S-CSCF. The P-CSCF and I-CSCF process the SIP REGISTER message according to a standard SIP user registration procedure (reference can be made to 3GPP TS 24.229), and then forward the message to an S-CSCF.

Step 304: The S-CSCF sends the first user identity and the registration authentication identifier to the network authentication server.

When determining that the registration request uses a bearer authentication method, the S-CSCF sends the first user identity and the registration authentication identifier to the network authentication server, to request the network authentication server to perform authentication on the calling user by using the registration authentication identifier.

The S-CSCF in this embodiment sends the first user identity and the registration authentication identifier to the network authentication server by using a hypertext transfer protocol over secure socket layer (hypertext transfer protocol over secure socket layer, HTTPS) request message. The HTTPS request message may be as follows.

HTTPS POST uniform resource identifier (URI)=TAM-BaseRealm/zhangsan%40xxx.com@2b.ims.<operator>.com/open-authorize{"token"}

In the message, "TAMBaseRealm" indicates the network authentication server to perform the registration procedure in this embodiment for the message, "zhangsan %40xxx.com" is the first user identity, and "token" is the registration authentication identifier.

Step 305: The network authentication server sends an authentication request to the enterprise authentication server.

When the network authentication server in this embodiment receives the first user identity, a corresponding enterprise authentication server may be determined based on the first user identity.

It can be learned from the foregoing example that the first user identity in this embodiment is a user's email address (for example, zhangsan@xxx.com), and the network authentication server may obtain the enterprise domain name (for example, xxx.com) from the first user identity. The network authentication server can query an address of the enterprise authentication server based on the enterprise domain name.

Specifically, it can be learned from the foregoing descriptions that the first user identity received by the network authentication server from the S-CSCF is zhangsan %40xxx.com. In the process in which the network authentication server determines a corresponding enterprise authentication server based on the first user identity, the enterprise authentication server recovers the first user identity (zhangsan %40xxx.com) that is escaped, to obtain a first user identity (zhangsan@xxx.com) that is recovered from escape. It can be learned that the network authentication server may query an address of the corresponding enterprise authentication server based on the first user identity that is recovered from escape.

The authentication request sent by the network authentication server to the enterprise authentication server in this embodiment includes the registration authentication identifier.

Optionally, in this embodiment, the authentication request may be sent by using HTTPS.

In this embodiment, to ensure security of a message exchanged between the network authentication server and the enterprise authentication server, and improve security of a process of performing the call processing method in this application, a transport layer security (TLS) protocol secure connection may be established between the network authentication server and the enterprise authentication server in this embodiment. Based on the TLS connection, the security of the message exchanged between the network authentication server and the enterprise authentication server is ensured.

The following describes an example of a process of establishing the TLS secure connection between the network authentication server and the enterprise authentication server.

The network authentication server receives a first CA certificate corresponding to a device certificate of the enterprise authentication server, and the enterprise authentication server receives a second CA certificate corresponding to a device certificate of the network authentication server. Specifically, the first CA certificate in this embodiment may be sent by the operator management device to the network authentication server in Embodiment 1.

To create the TLS secure connection between the enterprise authentication server and the network authentication server, the network authentication server uses the first CA certificate, and the enterprise authentication server uses the second CA certificate, so that security of the message exchanged between the network authentication server and the enterprise authentication server can be ensured.

For example, the authentication request may be as follows.

HTTPS GET URI=BaseRealm/zhangsan%40xxx.com@2b.ims.<operator>.com/token

In the message, "token" is a registration authentication identifier.

Step 306: The enterprise authentication server determines whether the registration authentication identifier is valid, and if not, the enterprise authentication server performs step 307, or if yes, the enterprise authentication server performs step 308.

The registration authentication identifier in this embodiment is a token, and the enterprise authentication server may determine whether the token is within a validity period, where the validity period may be an absolute validity period. For example, a start moment of the validity period is A1, and an end moment of the validity period is A2, where the moment A1 and the moment A2 may be any two different moments. If the enterprise authentication server determines that the token is within the validity period, the enterprise authentication server determines that the token is valid. If the enterprise authentication server determines that the token is not within the validity period, the enterprise authentication server determines that the token is invalid.

For another example, the validity period may be a remaining validity period. It can be learned that, if the registration authentication identifier is within a remaining validity period, the enterprise authentication server determines that the token is valid; or if the registration authentication identifier is not within the remaining validity period, the enterprise authentication server determines that the token is invalid.

Step 307: The enterprise authentication server sends an authentication identifier invalidity notification to the network authentication server.

Specifically, the enterprise authentication server in this embodiment sends the authentication identifier invalidity notification to the network authentication server through the TLS secure connection, where the authentication identifier invalidity notification indicates that the registration authentication identifier (token) is invalid. When the network authentication server receives the authentication identifier invalidity notification, a procedure related to registration of the calling user is not performed.

Step 308: The enterprise authentication server sends an authentication success indication to the network authentication server.

The authentication success indication in this embodiment includes an authentication identifier validity notification, and the authentication identifier validity notification indicates that the registration authentication identifier (token) is valid.

The authentication success indication in this embodiment further includes a third user identity. Specifically, the enterprise authentication server creates correspondences between different user identities and different authentication identifiers in advance. When the enterprise authentication server determines that the registration authentication identifier is valid, the enterprise authentication server may send the third user identity corresponding to the valid registration authentication identifier to the network authentication server.

Optionally, in this embodiment, the enterprise authentication server may send the authentication success indication by using HTTPS protocol.

The authentication success indication in this embodiment may be as follows.

> HTTPS
> 200{"tokenTimeout":"XXX","employeeName":"zhang-san","employeeAyatarUri":"http:123.123.123234.jpg" "employeeId":"123234","calloutRight":"true"}

In the authentication success indication, "tokenTimeout": "XXX" indicates a validity period of a registration authentication identifier, "employeeName": "zhangsan" indicates that a name of a calling user is zhangsan, and "employee-AyatarUri": "http: 123.123.123234.jpg" may indicate a download address of an avatar of a calling user. It should be noted that, in this example, the authentication success indication includes the download address of the avatar of the calling user, and in another example, the authentication success indication may further include other information. This is not specifically limited. In the authentication success indication, "calloutRight": "true" indicates that a calling user has a right to make an outbound call.

Step 309: The network authentication server sends initial data to the application server.

In this embodiment, when the network authentication server determines that the calling user is authenticated, the network authentication server may send the obtained initial data to the application server.

The initial data in this embodiment includes identity information of the calling user and information of an enterprise to which the calling user belongs. The identity information of the calling user comes from the enterprise authentication server.

The following describes an optional manner in which the network authentication server obtains the information of the enterprise to which the calling user belongs.

Manner 1:

In the phase of enterprise account opening described in Embodiment 1, in step 202, the network authentication server receives the enterprise account opening data from the operator management device. Therefore, in this embodiment, the network authentication server can determine the enterprise account opening data corresponding to the enterprise authentication server, to determine that a part or all of information in the enterprise account opening data is the information of the enterprise to which the calling user belongs.

Manner 2:

The network authentication server in this manner receives the information of the enterprise to which the calling user belongs from the enterprise authentication server.

The enterprise authentication server in this embodiment may obtain the information of the enterprise to which the calling user belongs in the enterprise account opening phase described in Embodiment 1, or the enterprise authentication server may pre-store the information of the enterprise to which the calling user belongs. In addition, when the enterprise authentication server determines that the registration authentication identifier is valid, the enterprise authentication server sends, to the network authentication server, the information of the enterprise to which the calling user belongs.

The network authentication server in this embodiment determines, in two optional manners, that the calling user is authenticated.

Manner 1:

The network authentication server determines, under two conditions, that authentication succeeds. One condition is that the authentication identifier validity notification is received. The other condition is that the network authentication server determines that the first user identity and the third user identity are the same.

The initial data in this embodiment is used by the application server to trigger a call from a calling user to a called user, where user data of the calling user includes but is not limited to: a call right, an outbound call number, and a name of the calling user (a related message complies with the 3GPP standard protocol 29.562).

Manner 2:

The authentication request sent by the network authentication server to the enterprise authentication server also includes the first user identity. When determining that the registration authentication identifier is valid and that the first user identity and the third user identity are the same, the enterprise authentication server sends a registration authentication success indication to the network authentication server.

The following describes a specific process in which the network authentication server sends the initial data to the application server.

First, when determining that the calling user is authenticated, the network authentication server caches identity information of the calling user, and returns an authentication success response to the S-CSCF, where the authentication success response includes a validity period of the token.

The authentication identifier validity notification in this embodiment may be an HTTPS 200 message. Description of a specific message type is an optional example. This is not limited.

For example, the HTTPS 200 may be HTTPS 200{"tokenTimeOut":"XXX"}, where "tokenTimeout": "XXX" indicates a validity period of a registration authentication identifier.

The S-CSCF interacts with the network authentication server to register the calling user with the operator network. The S-CSCF downloads the iFC information (a related message complies with the 3GPP standard protocol 29.562) from the network authentication server.

Further, the S-CSCF returns a registration success response to the calling device via the P-CSCF, where the registration success response indicates that the calling user successfully registers with the operator network.

Then the S-CSCF sends a third-party registration request to the application server based on the iFC information.

Then the application server downloads the initial data from the network authentication server based on the third-party registration request.

Step 310: The application server obtains an initial call business card.

The initial call business card in embodiment is business card information formed by typesetting the initial data in a typesetting manner of the call business card.

For descriptions of a typesetting manner of the call business card, the identity information of the calling user, and the information of the enterprise to which the calling user belongs, refer to Embodiment 1. Details are not described in this embodiment.

Several optional manners of obtaining the initial call business card by the application server in this embodiment are described below by way of example.

Manner 1:

The application server receives identity information of the calling user, information of the enterprise to which the calling user belongs, and a typesetting manner of the call business card from the network authentication server; and forwards the identity information of the calling user, the information of the enterprise to which the calling user belongs, and the typesetting manner of the call business card to a media plane device (for example, the network element 122 shown in FIG. 1).

The media plane device may typeset the identity information of the calling user and the information of the enterprise to which the calling user belongs in the typesetting manner of the call business card, to obtain the initial call business card.

The identity information of the calling user in this embodiment may be one or more of the following terms:

a name of the calling user, an avatar of the calling user, an employee ID of the calling user, a call right of the calling user, an outbound call number corresponding to the calling user, and a call intention of the calling user, where the outbound call number is the E.164 number of the calling user.

The call intention indicates an overview of an intention of a call made by the calling user to the called user. Specifically, call intentions are different in different scenarios to which the method in this embodiment is applied to. This is not specifically limited in this embodiment. For example, if the enterprise to which the calling user belongs is a real estate company, the call intention may be "recommend sale information of a building A".

If the identity information of the calling user in this embodiment does not include the call right of the calling user, the network authentication server can determine that the call right corresponding to the calling user is a default call right of the enterprise. For descriptions of the default call right, refer to Embodiment 1. Details are not described in this embodiment.

The information of the enterprise to which the calling user belongs in this embodiment may be one or more of the following terms:

trustworthy information of the enterprise, information of a service subscribed by the enterprise, a typesetting manner of a call business card, or iFC information of the enterprise. For descriptions of the pieces of information, refer to Embodiment 1. Details are not described again.

The media plane device sends the generated initial call business card to a file server for storage, and sends a storage address of the initial call business card to the application server.

Optionally, in another example, the application server may directly typeset the identity information of the calling user and the information of the enterprise to which the calling user belongs in the typesetting manner of the call business card, to obtain the initial call business card. The application server sends the generated initial call business card to the file server for storage, and locally records a storage address of the initial call business card.

Manner 2:

In this manner, the network authentication server obtains identity information of the calling user, information of the enterprise to which the calling user belongs, and a typesetting manner of the call card, and typesets the identity information of the calling user and the information of the enterprise to which the calling user belongs in the typesetting manner of the call business card, to generate the initial call business card.

For a specific process in which the network authentication server obtains the typesetting manner of the call business card in this embodiment, refer to the foregoing process in which the network authentication server obtains the information of the enterprise to which the calling user belongs. Details are not described again.

The manner in which the network authentication server sends the initial call business card to the application server may be as follows. The network authentication server stores the initial call business card to a file server, and the network authentication server sends a storage address of the initial call business card to the application server. The application server may download the initial call business card from the file server according to the address.

According to the method in this embodiment, when a calling user inside an enterprise makes a call to a called user outside the enterprise, a procedure of registration processing is first executed. Based on the procedure of registration processing, initial data including identity information of the calling user and/or information of the enterprise to which the calling user belongs is typeset in a typesetting manner of a call business card, to obtain an initial call business card. In this way, when the calling user subsequently makes a call to the called user, the operator network can directly send the initial call business card to the called user, and therefore, the call business card does not need to be generated during the call. In this case, a call processing latency is shortened, and call efficiency is improved. In addition, according to the method in this embodiment, the process of performing authentication on the calling user by the enterprise as indicated by the trustworthy security association can be created.

Further, according to the method in this embodiment, the calling user can use a service of calling the called user provided by the operator network without opening an account in the operator network. It can be learned that, according to the method in this embodiment, the calling user can call the called user without opening the account. This solution solves a problem of opening an account for an enterprise employee (that is, a calling user) in an operator network leased by an enterprise, thereby avoiding problems of slow time to market of the calling user and privacy information leakage of the calling user caused by opening the account for the calling user in the operator network.

Embodiment 3

Figure 4A:
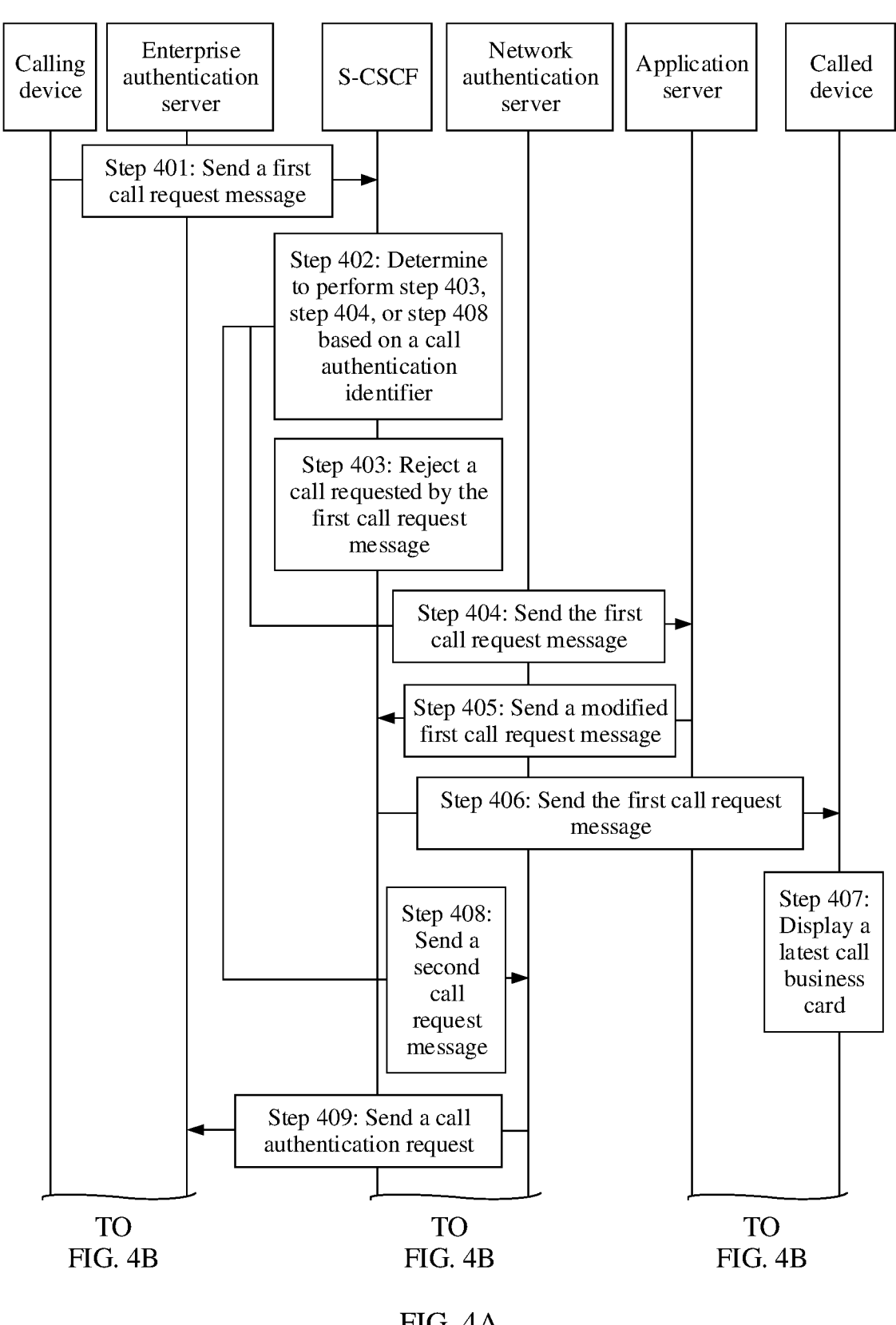
FIG. 4A and FIG. 4B are a flowchart of steps of a process in which a communications system executes calling according to an embodiment of this application.
Figure 4B:
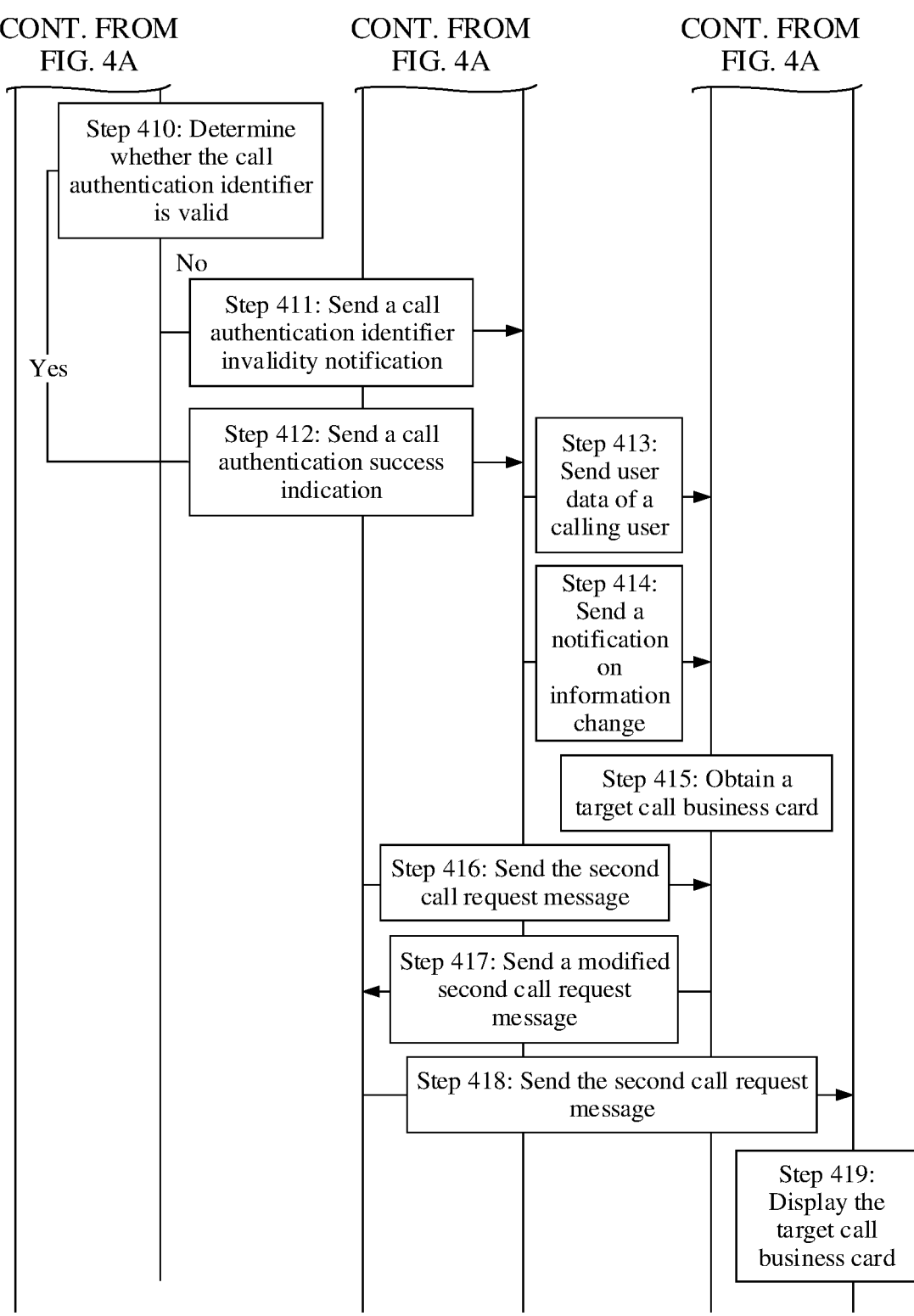

Based on the method shown in FIG. 3, this embodiment describes how a calling user makes a call to a called user via a calling device when the calling user has registered with an operator network. For details, refer to FIG. 4A and FIG. 4B. FIG. 4 A and FIG. 4B are a flowchart of steps of a process in which a communications system executes calling according to an embodiment of this application.

Step 401: A calling device sends a first call request message to an S-CSCF.

When a calling user determines to make a call to a called user, the calling user may send the first call request message to the S-CSCF via a calling device, to trigger the call made by the calling user to the called user.

The first call request message may be a SIP INVITE message, where the SIP INVITE message includes a first user identity of the calling user and a call authentication identifier. For descriptions of the first user identity and the call authentication identifier, refer to the descriptions of the user identity and the registration authentication identifier of the calling user in Embodiment 2, and details are not described again.

The following describes a process in which the calling device sends the first call request message to the S-CSCF.

The calling device sends the SIP INVITE message to the P-CSCF, and the P-CSCF processes the SIP INVITE message according to a standard procedure in which a SIP user originates a call (reference can be made to 3GPP TS 24.229 and 3GPP TS 26.114) and forwards the message to the S-CSCF.

An example format of the SIP INVITE message in this embodiment may be shown as follows.

INVITE tel:+86139XXXXXXXXX
From:<sip:zhangsan
    %40xxx.com@2b.ims.<operator>.com>
To:<tel:+86139XXXXXXXXX>
Authorization: Bearer <Base64(<token>)>

In the message, "+86139XXXXXXXXX" is a number of the called user. For descriptions of other content in the SIP INVITE message, refer to the second embodiment, and details are not described in this embodiment.

Step 402: When the S-CSCF determines that the call authentication identifier meets a first preset condition, the S-CSCF performs step 403; when the S-CSCF determines that the call authentication identifier meets a second preset condition, the S-CSCF performs step 404; or when the S-CSCF determines that the call authentication identifier meets a third preset condition, the S-CSCF performs step 408.

If the S-CSCF determines that the call authentication identifier is the same as a target authentication identifier, and the target authentication identifier is invalid, the S-CSCF determines that the call authentication identifier meets the first preset condition. The target authentication identifier is a registration authentication identifier cached by the S-CSCF in the registration phase in Embodiment 2, or an authentication identifier used by the calling user in a previous call.

If the S-CSCF determines that the call authentication identifier is the same as a target authentication identifier, and the target authentication identifier is valid, the S-CSCF determines that the call authentication identifier meets the second preset condition.

If the S-CSCF determines that the call authentication identifier is different from a target authentication identifier, the S-CSCF determines that the call authentication identifier is a registration authentication identifier that is not stored to the S-CSCF in the registration phase, or that the call authentication identifier is an authentication identifier used in a previous call of the calling user, and the S-CSCF determines that the call authentication identifier meets the third preset condition.

Step 403: The S-CSCF rejects a call requested by the first call request message.

When the S-CSCF rejects the call requested by the first call request message, the calling user cannot call the called user based on the first call request message.

Step 404: The S-CSCF sends the first call request message to an application server.

Specifically, in the registration phase, the S-CSCF creates a correspondence between the first user identity of the calling party and an iFC. The first user identity in this embodiment is the user identity in the registration phase of the calling user in Embodiment 2. For descriptions of the iFC, refer to Embodiment 2, and details are not described again.

The S-CSCF in this embodiment sends the first call request message to the application server according to iFC information.

Step 405: The application server determines that the calling user has an outbound call right, and forwards a modified first call request message to the S-CSCF.

When the calling user has registered with the operator network, the application server creates the correspondence between the first user identity of the calling user and the call right. It can be learned that, when receiving the first user identity of the calling user, the application server can determine a corresponding call right. This embodiment is described by using an example in which the call right corresponding to the first user identity of the calling user includes the outbound call right.

The following describes an example manner in which the application server modifies the first call request message.

The application server may add a Display Name parameter to a From header field of the first call request message, where a value of the Display Name parameter is a name of an enterprise and a name of a calling user. Optionally, information such as an employee ID of a calling user may be added to the value of the Display Name parameter.

The application server may further change the user identity of the calling user in a From header field and a P-Asserted-Identity (PAI) header field of the first call request message to an outbound call number of the calling user.

Step 406: The S-CSCF sends the first call request message to a called device.

Specifically, the S-CSCF forwards the first call request message to an operator network to which the called device belongs, and then the operator network to which the called device belongs sends the first call request message to the called device.

The first call request message in this embodiment includes a storage address of a latest call business card, and the latest call business card may be the initial business card in Embodiment 2, or a call business card generated for a previous call of the calling user.

Step 407: The called device displays the latest call business card.

The operator network sends the latest call business card to the called device.

For example, when the called device rings, if the called device supports a video call function, the application server controls a media plane device to send a latest call business card in a multimedia caller identification format to the called device.

For another example, when the called device rings, if the called device does not support the video call function, the called device displays the latest call business card, where the latest call business card is content of the Display Name parameter carried in the first call request message.

Optionally, the operator network pushes the storage address of the latest call business card to the called device, and the called device downloads the latest call business card based on the storage address of the latest call business card.

For example, when the called device rings, if the called device supports a video call function, the called device displays the latest call business card in a multimedia caller identification format.

For another example, when the called device rings, if the called device does not support the video call function, the called device displays the latest call business card, where the latest call business card is content of the Display Name parameter carried in the first call request message.

Step 408: The S-CSCF sends a second call request message to a network authentication server.

In this embodiment, if the S-CSCF determines that the call authentication identifier meets the third preset condition, when the S-CSCF determines that the second call request message uses a bearer authentication method, for example, the second call request message includes Authorization: Bearer <Base64(<token>)>. The S-CSCF sends the second call request message including the first user identity and the call authentication identifier to the network authentication server, to request the network authentication server to perform authentication on the calling user by using the call authentication identifier.

Step 409: The network authentication server sends a call authentication request to the enterprise authentication server.

For a process in which the network authentication server sends the call authentication request to the enterprise authentication server in this embodiment, refer to the process in which the network authentication server sends the authentication request to the enterprise authentication server in step 305 in Embodiment 2. Details are not described again.

The call authentication request in this embodiment is used for the call made by the calling user to the called user.

Step 410: The enterprise authentication server determines whether the call authentication identifier is valid, and if not, the enterprise authentication server performs step 411; or if yes, the enterprise authentication server performs step 412.

For a specific execution process of step 410 in this embodiment, refer to the process in which the enterprise authentication server determines whether the registration authentication identifier is valid in step 306 in Embodiment 2. Details are not described again.

Step 411: The enterprise authentication server sends a call authentication identifier invalidity notification to the network authentication server.

Specifically, the enterprise authentication server in this embodiment sends the call authentication identifier invalidity notification to the network authentication server through a TLS secure connection, where the call authentication identifier invalidity notification indicates that the call authentication identifier is invalid. When the network authentication server receives the call authentication identifier invalidity notification, a related procedure in which the calling user calls the called user is not implemented.

Step 412: The enterprise authentication server sends a call authentication success indication to the network authentication server.

The call authentication success indication in this embodiment includes a call authentication identifier validity notification, and the call authentication identifier validity notification indicates that the call authentication identifier is valid.

For a process in which the enterprise authentication server sends the call authentication success indication in this embodiment, refer to the process in which the enterprise authentication server sends the call authentication success indication to the network authentication server in step 308. Details are not described in this embodiment.

The call authentication success indication in this embodiment further includes a second user identity. When the enterprise authentication server determines that the call authentication identifier is valid, the enterprise authentication server may send the second user identity corresponding to the valid call authentication identifier to the network authentication server.

Step 413: The network authentication server sends target data to the application server.

In this embodiment, when the network authentication server determines that the calling user is authenticated, the network authentication server may send the obtained target data to the application server.

The target data in this embodiment includes identity information of the calling user and information of an enterprise to which the calling user belongs. The identity information of the calling user comes from the enterprise authentication server. For a process in which the network authentication server obtains the information of the enterprise to which the calling user belongs in this embodiment, refer to step 309 in Embodiment 2, and details are not described again.

The network authentication server in this embodiment determines, in two optional manners, that the calling user is authenticated.

Manner 1:

The network authentication server determines, under two conditions, that authentication succeeds. One condition is that the call authentication identifier validity notification is received. The other condition is that the network authentication server determines that the first user identity and the second user identity are the same.

Manner 2:

The authentication request sent by the network authentication server to the enterprise authentication server also includes the first user identity. When determining that the call authentication identifier is valid and that the first user identity and the second user identity are the same, the enterprise authentication server sends the call authentication success indication to the network authentication server.

For a specific process in which the network authentication server sends the target data to the application server in this embodiment, refer to the process in which the network authentication server sends the initial data to the application server in step 309 in Embodiment 3. Details are not described again.

Step 414: The network authentication server sends a notification on information change to the application server.

The notification on information change in this embodiment indicates that the target data stored in the network authentication server is changed.

Step 415: The application server obtains a target call business card.

In this embodiment, when the application server determines, based on the notification on information change, that the target data of the calling user is changed, the application server may obtain changed target data of the calling user (a related message complies with the 3GPP standard protocol 29.562).

The target call business card in this embodiment is business card information formed by typesetting the target data in a typesetting manner of the call business card, where the target data includes the identity information of the calling user and information of the enterprise to which the calling user belongs.

For descriptions of the typesetting manner of the call business card and the target data, refer to step 310 in Embodiment 2. Details are not described in this embodiment.

For several optional manners in which the application server obtains the target call business card in this embodiment, refer to the descriptions of obtaining the initial calling business card in step 310. Details are not described again.

Step 416: The S-CSCF sends the second call request message to the application server.

Step 417: The application server determines that the calling user has an outbound call right, and forwards a modified second call request message to the S-CSCF.

Step 418: The S-CSCF sends the second call request message to the called device.

For descriptions of an execution process of step 416 to step 418 in this embodiment, refer to step 404 to step 406. Details are not described again.

Step 419: The called device displays the target call business card.

For a process in which the called device displays the target call business card in this embodiment, refer to the process in which the called device displays the latest call business card in step 407. Details are not described again.

In this embodiment, a trustworthy security association is established between the operator network, the enterprise, and the enterprise employee (the calling user), so that when the called device rings, displayed information of the call business card is trustworthy, and the call business card is typeset in the typesetting manner of the call business card. This ensures that the information presented by the call business card meets a customization requirement of the enterprise, and a unified style is applied to the call business card.

In the process of call processing, because the calling user does not need to directly open an account in the operator network, privacy information of the calling user is not exposed to the operator. In addition, in the process of calling the called user, the information displayed on the call business card may not include the privacy information of the calling user. In this way, the security of the privacy information of the calling user is effectively ensured.

All information included in the calling business card displayed by the called device in this embodiment is from the enterprise authentication server and/or enterprise account opening data instead of the calling user. If the calling business card has a forgery problem, source tracing and accountability can be performed based on a trust chain formed by the trustworthy security association.

Embodiment 4

Figure 5:
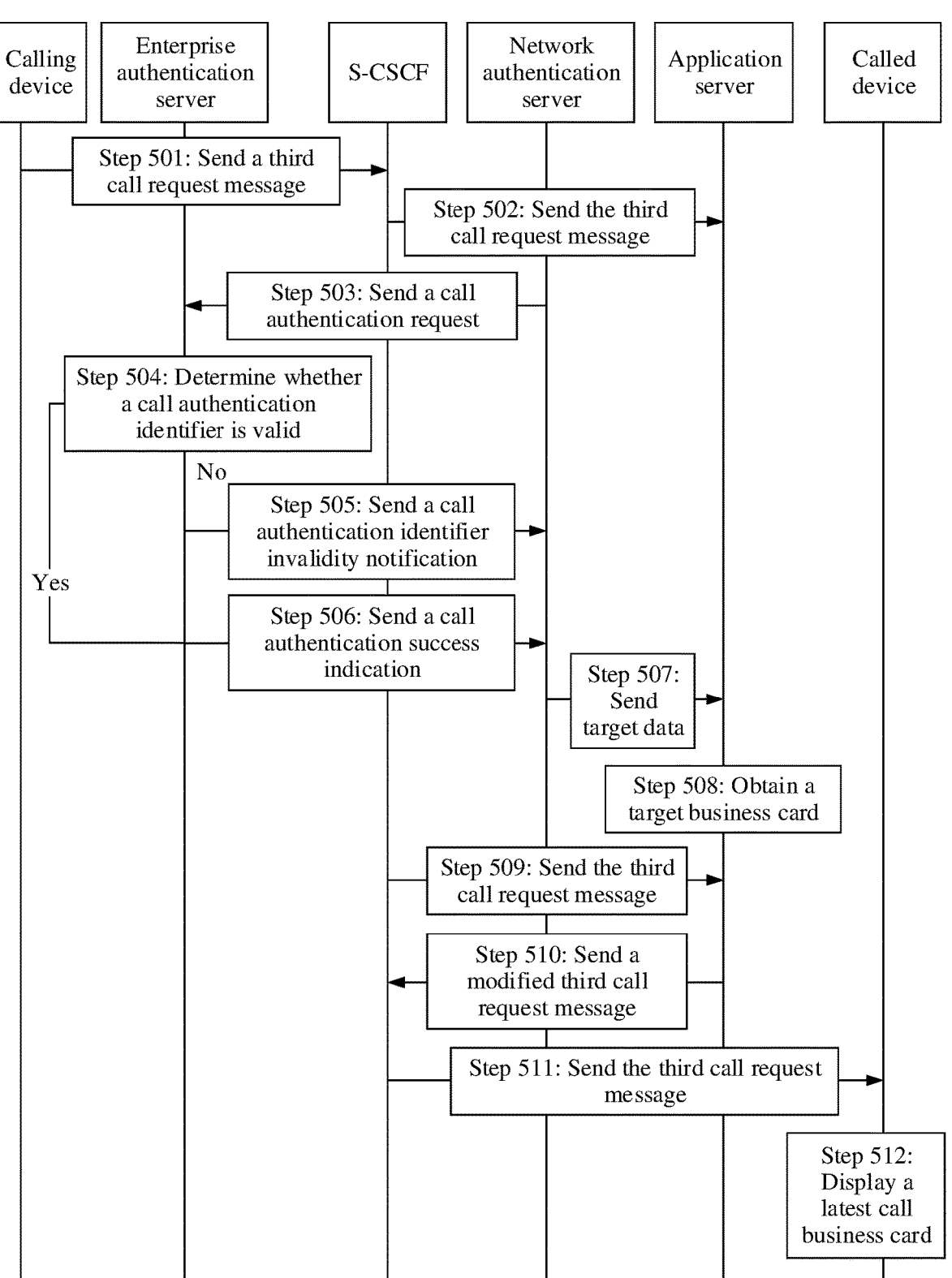
FIG. 5 is a flowchart of steps of a process in which a communications system executes calling according to another embodiment of this application.

In a process in which a calling user makes a call to a called user in this embodiment, the calling user does not need to register with an operator network in advance. With reference to FIG. 5, the following describes a process in which a calling user makes a call to a called user while the calling user does not need to register with an operator network in advance.

Step 501: The calling device sends a third call request message to an S-CSCF.

When the calling user determines to make a call to the called user, the calling user may send the third call request message to the S-CSCF via the calling device, to trigger the call made by the calling user to the called user.

The third call request message may be a SIP INVITE message, where the SIP INVITE message includes a first user identity of the calling user and a call authentication identifier. For descriptions of the first user identity and the call authentication identifier, refer to the descriptions of the first user identity of the calling user and the call authentication identifier in Embodiment 3, and details are not described again.

Step 502: The S-CSCF sends the third call request message to an application server.

In this embodiment, if the S-CSCF determines that the call authentication identifier included in the third call request message is different from a target authentication identifier used in a previous call of the calling user, and the S-CSCF determines that the third call request message uses a bearer authentication method, the S-CSCF sends the third call request message that includes the first user identity and the call authentication identifier to the network authentication server, so as to request the network authentication server to perform authentication on the calling user by using the call authentication identifier. For details about the bearer authentication method, refer to Embodiment 3. Details are not described again.

Step 503: The network authentication server sends a call authentication request to the enterprise authentication server.

For a process in which the network authentication server sends the call authentication request to the enterprise authentication server in this embodiment, refer to step 409 in Embodiment 3. Details are not described again.

Step 504: The enterprise authentication server determines whether the call authentication identifier is valid, and if not, the enterprise authentication server performs step 505; or if yes, the enterprise authentication server performs step 506.

For a specific execution process of step 504 in this embodiment, refer to step 410 in Embodiment 3. Details are not described again.

Step 505: The enterprise authentication server sends a call authentication identifier invalidity notification to the network authentication server.

Step 506: The enterprise authentication server sends a call authentication success indication to the network authentication server.

Step 507: The network authentication server sends target data to the application server.

For a specific execution process of step 505 to step 507 in this embodiment, refer to step 411 to step 413 in Embodiment 3. Details are not described again.

Step 508: The application server obtains a target call business card.

In this embodiment, the application server obtains the target data from the network authentication server. The target call business card in this embodiment is business card information formed by typesetting the target data in a typesetting manner of the call business card, where the target data includes the identity information of the calling user and information of the enterprise to which the calling user belongs. For details of the target data, refer to Embodiment 3. The details are not described again.

Step 509: The S-CSCF sends the third call request message to the application server.

Step 510: The application server determines that the calling user has an outbound call right, and forwards a modified third call request message to the S-CSCF.

Step 511: The S-CSCF sends the third call request message to the called device.

Step 512: The called device displays the target call business card.

For descriptions of an execution process of step 509 to step 512 in this embodiment, refer to step 416 to step 419 in Embodiment 3. Details are not described again.

In this embodiment, in the process of making a call to the called user, the calling user does not need to register with the operator network in advance. Therefore, a step in which the calling user performs registration in advance in the process of making a call to the called user is avoided, and efficiency of calling the called user is improved. In addition, consumption of registration-related resources is reduced.

In addition, a trustworthy security association is established between the operator network, the enterprise, and the enterprise employee (the calling user), so that when the called device rings, displayed information of the call business card is trustworthy, and the call business card is typeset in the typesetting manner of the call business card. This ensures that the information presented by the call business card meets a customization requirement of the enterprise, and a unified style is applied to the call business card.

In the process of call processing, because the calling user does not need to directly open an account in the operator network, privacy information of the calling user is not exposed to the operator. In addition, in the process of calling the called user, the information displayed on the call business card may not include the privacy information of the calling user. In this way, the security of the privacy information of the calling user is effectively ensured.

All information included in the calling business card displayed by the called device in this embodiment is from the enterprise authentication server and/or enterprise account opening data instead of the calling user. If the calling business card has a forgery problem, source tracing and accountability can be performed based on a trust chain formed by the trustworthy security association.

Embodiment 5

In Embodiment 2 to Embodiment 4, an example in which an operator network is an IMS network is used. In this embodiment, a specific network type of the operator network is not limited. For example, the operator network in this embodiment is applicable to a telecommunications network of any architecture. A specific network type is not limited in this embodiment.

Figure 6:
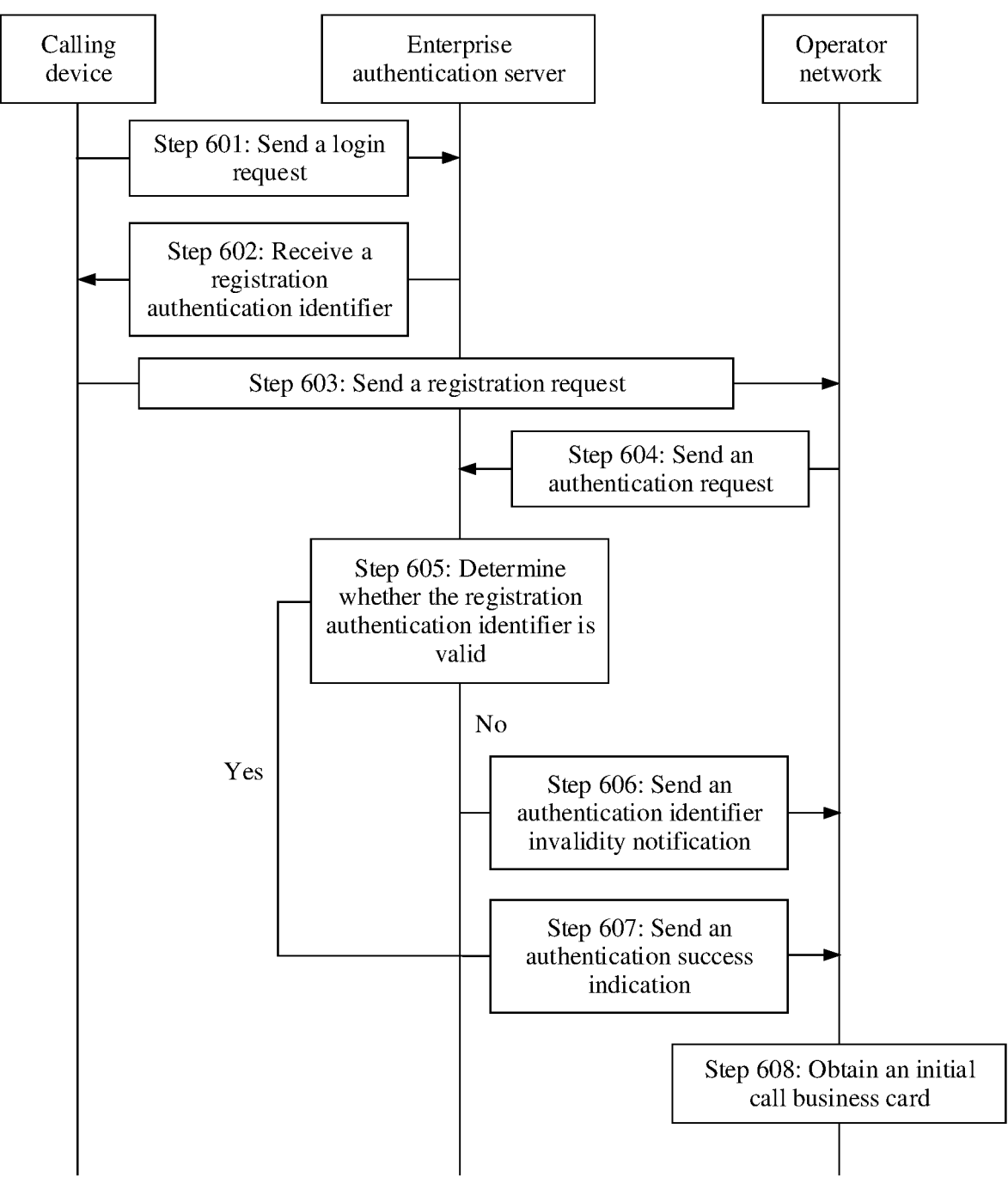
FIG. 6 is a flowchart of steps of a process in which a communications system executes registration according to another embodiment of this application.

In this embodiment, when a calling user inside an enterprise makes a call to a called user outside the enterprise, a procedure of registration processing is first executed. Based on the procedure of registration processing, initial data including identity information of the calling user and/or information of the enterprise to which the calling user belongs is typeset in a typesetting manner of a call business card, to obtain an initial call business card. In this way, when the calling user subsequently makes a call to the called user, an operator network can directly send the initial call business card to the called user, and therefore, the initial call business card does not need to be obtained during the call. In this case, an amount of information exchanged between the operator network and an enterprise authentication server during the call can be reduced, a call connection latency is shortened, and call efficiency is improved. In addition, according to the method in this embodiment, a process of performing authentication on the calling user by the enterprise as indicated by a trustworthy security association can be created. For details, refer to FIG. 6. FIG. 6 is a flowchart of steps of a process in which a communications system executes registration according to still another embodiment of this application.

Step 601: A calling device sends a login request to an enterprise authentication server.

Step 602: The calling device receives a registration authentication identifier from the enterprise authentication server.

For descriptions of an execution process of step 601 to step 602 in this embodiment, refer to step 301 and step 302 in Embodiment 2. Details are not described again.

Step 603: The calling device sends a registration request to an operator network.

For descriptions of the registration request in this embodiment, refer to step 303 in Embodiment 2. The details are not described again.

Step 604: The operator network sends an authentication request to the enterprise authentication server.

For descriptions of the authentication request in this embodiment, refer to step 305 in Embodiment 2. The details are not described again.

For descriptions of a specific process in which the operator network sends the authentication request to the enterprise authentication server based on the registration request in this embodiment, refer to step 303 to step 305 in Embodiment 2. A specific network element performing execution in the operator network is not limited in this embodiment.

Step 605: The enterprise authentication server determines whether the registration authentication identifier is valid, and if not, the enterprise authentication server performs step 606; or if yes, the enterprise authentication server performs step 607.

Step 606: The enterprise authentication server sends an authentication identifier invalidity notification to the operator network.

Step 607: The enterprise authentication server sends a registration authentication success indication to the operator network.

For descriptions of an execution process of step 605 to step 607 in this embodiment, refer to step 306 to step 308. Details are not described again.

Step 608: The operator network obtains an initial call business card.

For the process of obtaining the initial call business card by the operator network in this embodiment, refer to step 309 and step 310. A specific network element performing execution in the operator network is not limited in this embodiment.

Embodiment 6

Figure 7:
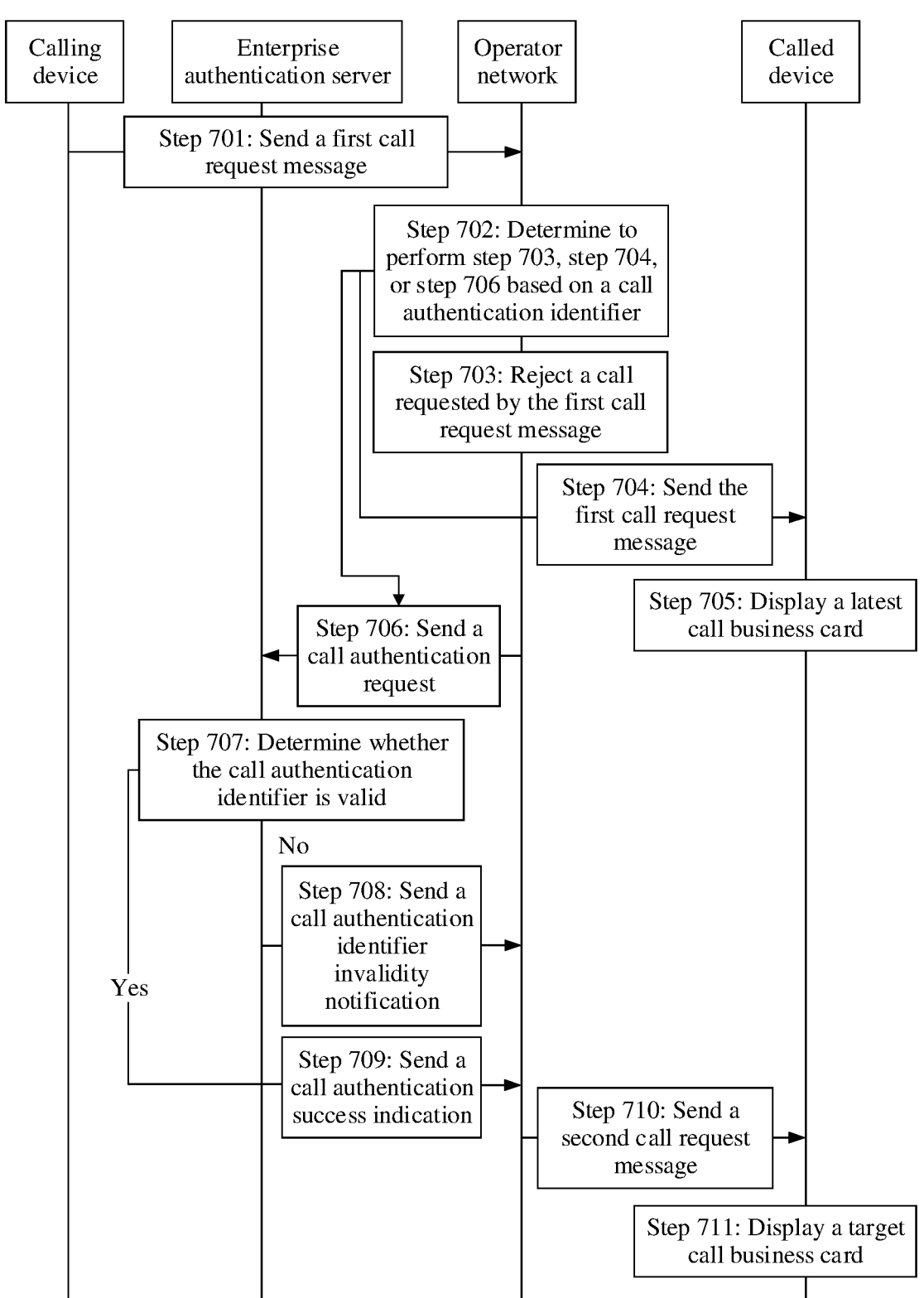
FIG. 7 is a flowchart of steps of a process in which a communications system executes calling according to still another embodiment of this application.

For descriptions of a specific type of an operator network in this embodiment, refer to Embodiment 5. Details are not described in this embodiment. Based on the method shown in FIG. 6, this embodiment describes how a calling user makes a call to a called user via a calling device when the calling user has registered with an operator network. For details, refer to FIG. 7. FIG. 7 is a flowchart of steps of a process in which a communications system executes calling according to still another embodiment of this application.

Step 701: A calling device sends a first call request message to an operator network.

For descriptions of the first call request message, refer to step 401 in Embodiment 3. Details are not described again.

Step 702: When the operator network determines that a call authentication identifier meets a first preset condition, the operator network performs step 703; when the operator network determines that the call authentication identifier meets a second preset condition, the operator network performs step 704; or when the operator network determines that the call authentication identifier meets a third preset condition, the operator network performs step 706.

For descriptions of a specific execution process of step 702 by the operator network in this embodiment, refer to step 402 in Embodiment 3. Details of the specific execution process are not described again.

Step 703: The operator network rejects a call requested by the first call request message.

For descriptions of a specific process in which the operator network rejects the call requested by the first call request message in this embodiment, refer to step 403 in Embodiment 3. A specific network element performing execution in the operator network is not limited in this embodiment.

Step 704: The operator network sends the first call request message to a called device.

For descriptions of an execution process of step 704 by the operator network in this embodiment, refer to step 404 to step 406 in Embodiment 3. Details of the specific execution process are not described again. A specific network element performing execution in the operator network is not limited in this embodiment.

Step 705: The called device displays a latest call business card.

For descriptions of an execution process of step 704 in this embodiment, refer to step 407 in Embodiment 3. Details of the specific execution process are not described again.

Step 706: The operator network sends a call authentication request to an enterprise authentication server.

For descriptions of an execution process of step 706 in this embodiment, refer to step 408 and step 409 in Embodiment 3. Details of the specific execution process are not described again.

Step 707: The enterprise authentication server determines whether the call authentication identifier is valid, and if not, the enterprise authentication server performs step 708; or if yes, the enterprise authentication server performs step 709.

Step 708: The enterprise authentication server sends a call authentication identifier invalidity notification to the operator network.

Step 709: The enterprise authentication server sends a call authentication success indication to the operator network.

Step 710: The operator network sends a second call request message to the called device.

For descriptions of an execution process of step 707 to step 710 in this embodiment, refer to step 410 to step 418. Details are not described again. A specific network element performing execution in the operator network is not limited in this embodiment.

Step 711: The called device displays a target call business card.

For descriptions of an execution process of step 711 in this embodiment, refer to step 419. Details are not described again.

Embodiment 7

Figure 8:
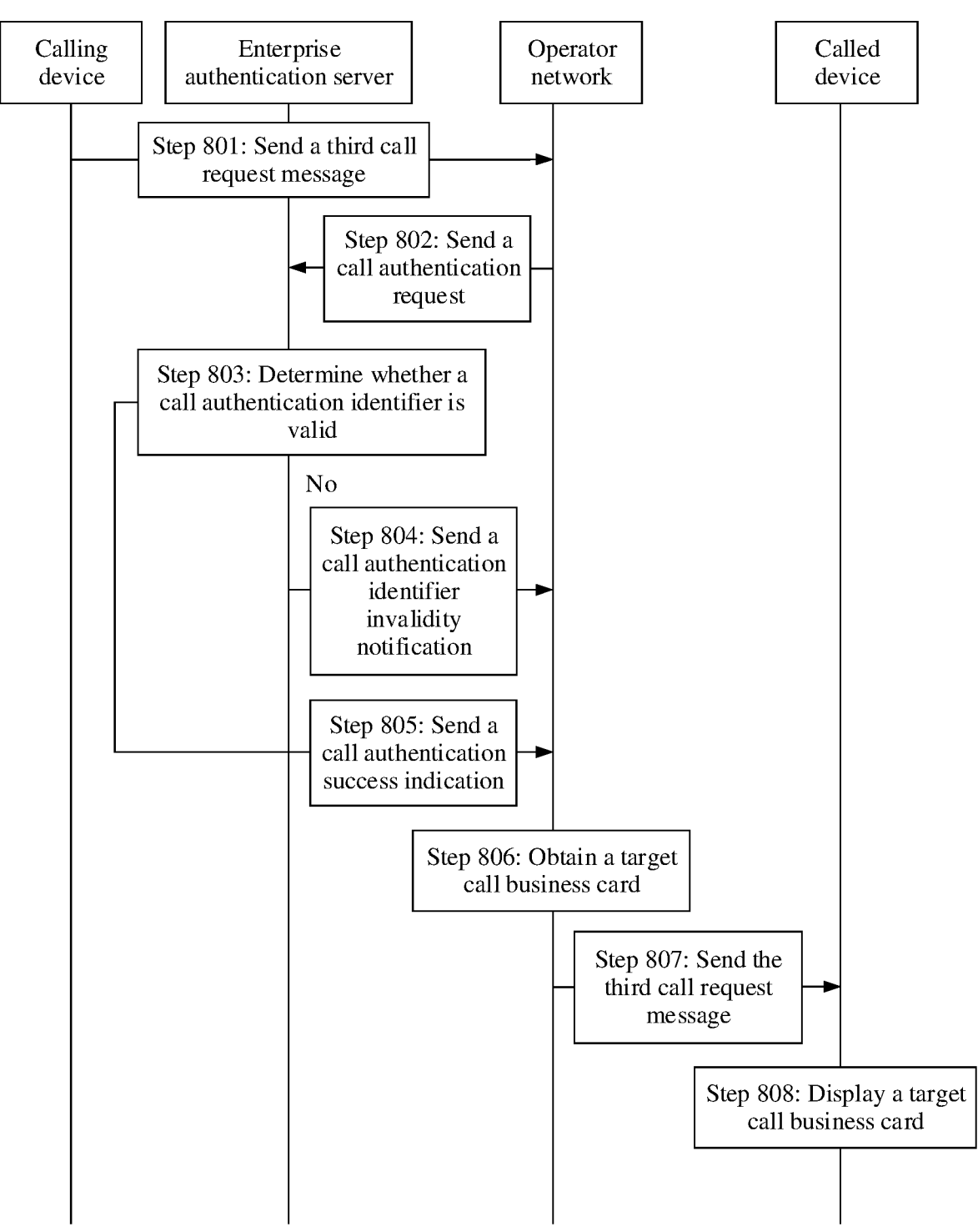
FIG. 8 is a flowchart of steps of a process in which a communications system executes calling according to yet another embodiment of this application.

For descriptions of a specific type of an operator network in this embodiment, refer to Embodiment 5. Details are not described in this embodiment. In a process in which a calling user makes a call to a called user described in this embodiment, the calling user does not need to register with an operator network in advance. With reference to FIG. 8, the following describes a process in which a calling user makes a call to a called user while the calling user does not need to register with an operator network in advance.

Step 801: A calling device sends a third call request message to an operator network.

Step 802: The operator network sends a call authentication request to an enterprise authentication server.

For descriptions of an execution process of step 801 and step 802 in this embodiment, refer to step 501 to step 503 in Embodiment 4. Details are not described again. A specific network element performing execution in the operator network is not limited in this embodiment.

Step 803: The enterprise authentication server determines whether a call authentication identifier is valid, and if not, the enterprise authentication server performs step 804; or if yes, the enterprise authentication server performs step 805.

Step 804: The enterprise authentication server sends a call authentication identifier invalidity notification to the operator network.

Step 805: The enterprise authentication server sends a call authentication success indication to the operator network.

For descriptions of an execution process of step 803 and step 805 in this embodiment, refer to step 504 to step 506 in Embodiment 4. Details are not described again. A specific network element performing execution in the operator network is not limited in this embodiment.

Step 806: The operator network obtains a target call business card.

For descriptions of an execution process of step 806 in this embodiment, refer to step 507 and step 508 in Embodiment 4. Details are not described again. A specific network element performing execution in the operator network is not limited in this embodiment.

Step 807: The operator network sends the third call request message to a called device.

For descriptions of an execution process of step 807 in this embodiment, refer to step 509 and step 511 in Embodiment 4. Details are not described again. A specific network element performing execution in the operator network is not limited in this embodiment.

Step 808: The called device displays the target call business card.

For descriptions of an execution process of step 808 in this embodiment, refer to step 512. Details are not described again.

For descriptions of beneficial effects of Embodiment 5 to Embodiment 7 in this application, refer to Embodiment 2 to Embodiment 4. Details are not described again.

Embodiment 8

Figure 9:
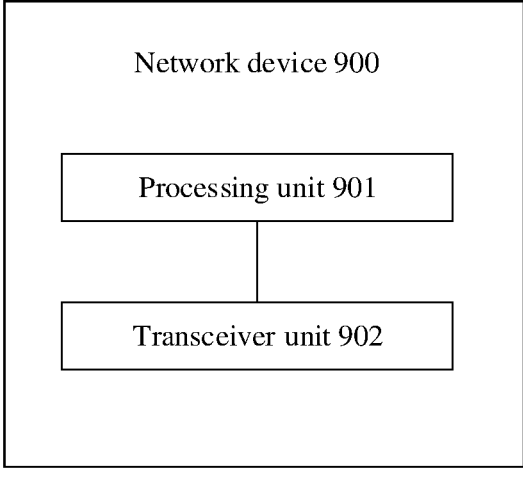
FIG. 9 is a schematic diagram of a structure of a network device according to an embodiment of this application.

With reference to FIG. 9, this embodiment describes a structure of a network device that performs the foregoing call processing method.

A network device 900 specifically includes: a processing unit 901 and a transceiver unit 902, where the processing unit 901 is connected to the transceiver unit 902.

If the network device 900 in this embodiment is a network authentication server, the processing unit 901 is configured to perform a processing function performed by the network authentication server in any of Embodiment 2 to Embodiment 4, and the transceiver unit 902 is configured to perform sending and receiving functions performed by the network authentication server in any of Embodiment 2 to Embodiment 4.

If the network device 900 in this embodiment is an enterprise authentication server, the processing unit 901 is configured to perform a processing function performed by the enterprise authentication server in any of Embodiment 2 to Embodiment 8, and the transceiver unit 902 is configured to perform sending and receiving functions performed by the enterprise authentication server in any of Embodiment 2 to Embodiment 8.

If the network device 900 in this embodiment is an S-CSCF, the processing unit 901 is configured to perform a processing function performed by the S-CSCF in any of Embodiment 2 to Embodiment 4, and the transceiver unit 902 is configured to perform sending and receiving functions performed by the S-CSCF in any of Embodiment 2 to Embodiment 4.

If the network device 900 in this embodiment is an application server, the processing unit 901 is configured to perform a processing function performed by the application server in any of Embodiment 2 to Embodiment 4, and the transceiver unit 902 is configured to perform sending and receiving functions performed by the application server in any of Embodiment 2 to Embodiment 4.

If the network device 900 in this embodiment is a calling device, the processing unit 901 is configured to perform a processing function performed by the calling device in any of Embodiment 2 to Embodiment 8, and the transceiver unit 902 is configured to perform sending and receiving functions performed by the calling device in any of Embodiment 2 to Embodiment 8.

If the network device 900 in this embodiment is a network operator, the processing unit 901 is configured to perform a processing function performed by the network operator in any of Embodiment 5 to Embodiment 7, and the transceiver unit 902 is configured to perform sending and receiving functions performed by the network operator in any of Embodiment 5 to Embodiment 7.

Embodiment 9

Figure 10:
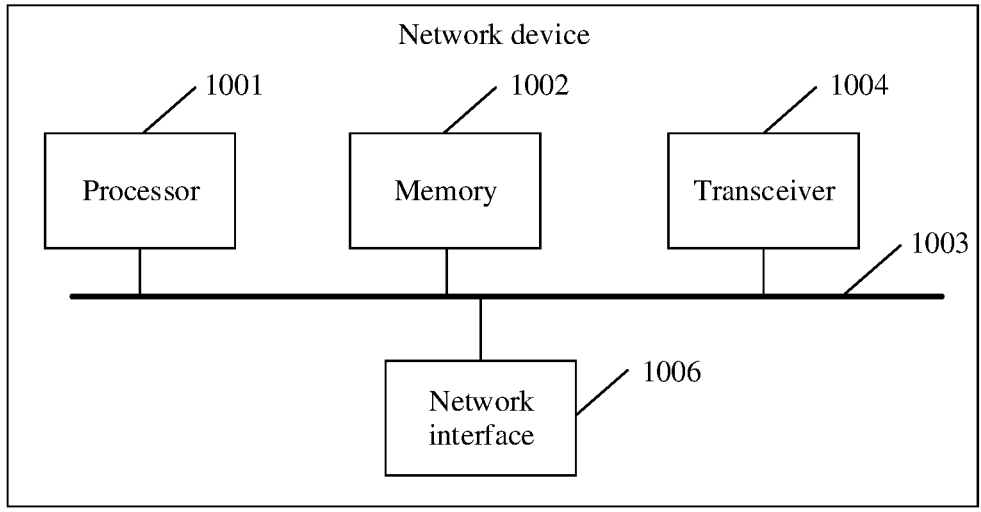
FIG. 10 is a schematic diagram of a structure of a network device according to another embodiment of this application.

A structure of a network device that performs the foregoing call processing method is described in this embodiment from a perspective of physical hardware with reference to FIG. 10.

The network device 1000 specifically includes a processor 1001, a memory 1002, a bus 1003, a transceiver 1004, and a network interface 1006.

Specifically, the memory 1002 may include a computer storage medium in a form of a volatile memory and/or a non-volatile memory, such as a read-only memory and/or a random access memory. The memory 1002 may store an operating system, an application, another program module, executable code, and program data.

The transceiver 1004 may be configured to input a command and information to the network device. The transceiver 1004 may be connected to the processor 1001 by using the bus 1003. The transceiver 1004 may be further configured to output information in the network device, for example, a selected placeholder server and/or a selected placeholder virtual machine.

The network device may be connected to a communications network through the network interface 1006. In a networking environment, computer-executable instructions stored in the network device may be stored in a remote storage device, but is not limited to local storage.

When the processor 1001 in the network device executes the executable code or the application stored in the memory 1002, the network device may perform a method operation on any side in the foregoing method embodiment. For a specific execution process, refer to the foregoing method embodiment, and details are not described herein again.

In conclusion, the foregoing embodiments are merely intended for describing the technical solutions of the present invention, but not for limiting the present invention. Although the present invention is described in detail with reference to the foregoing embodiments, a person of ordinary skill in the art should understand that modifications may still be made to the technical solutions described in the foregoing embodiments or equivalent replacements may be made to some technical features thereof, without departing from the scope of the technical solutions of embodiments of the present invention.

What is claimed is:

1. A method comprising:

receiving, by a network authentication server, a call request message from a calling device of a calling user, wherein the call request message comprises a first user identity of the calling user and a call authentication identifier;

sending, by the network authentication server, a call authentication request to an enterprise authentication server corresponding to the first user identity, wherein the call authentication request comprises the call authentication identifier;

receiving, by the network authentication server, a call authentication success indication corresponding to the call authentication request from the enterprise authentication server, wherein the call authentication success indication indicates that authentication of the call authentication identifier succeeds; and sending, by the network authentication server, target data to a called device of a called user, wherein the target data comprises identity information of the calling user or information of an enterprise to which the calling user belongs;

wherein before receiving, by the network authentication server, the call request message from the calling device, the method further comprises:

receiving, by the network authentication server, a registration request message from the calling device, wherein the registration request message comprises the first user identity and a registration authentication identifier;

sending, by the network authentication server, an authentication request to the enterprise authentication server corresponding to the first user identity, wherein the authentication request comprises the registration authentication identifier;

receiving, by the network authentication server, a registration authentication success indication corresponding to the authentication request from the enterprise authentication server, wherein the registration authentication success indication indicates that authentication of the registration authentication identifier succeeds; and obtaining, by the network authentication server, initial data, wherein the initial data comprises the identity information of the calling user or the information of the enterprise to which the calling user belongs.

2. The method according to claim 1, wherein the call authentication success indication comprises a second user identity, and sending, by the network authentication server, the target data to the called device comprises:

determining, by the network authentication server, that the first user identity is the same as the second user identity; and sending the target data to the called device.

3. The method according to claim 1, wherein sending, by the network authentication server, the target data to the called device comprises:

obtaining, by the network authentication server, the target data from the enterprise authentication server; and sending the target data to the called device.

4. The method according to claim 1, wherein sending, by the network authentication server, the target data to the called device comprises:

sending, by the network authentication server, the call request message to the called device, wherein the call request message comprises the target data.

5. The method according to claim 1, wherein sending, by the network authentication server, the target data to the called device comprises:

sending, by the network authentication server, the target data to the called device via a media plane device.

6. The method according to claim 1, wherein sending, by the network authentication server, the target data to the called device comprises:

obtaining, by the network authentication server, the target data from the enterprise authentication server;

typesetting the target data to generate typeset target data; and sending the typeset target data to the called device.

7. The method according to claim 1, wherein sending, by the network authentication server, the target data to the called device comprises:

obtaining, by the network authentication server, the target data from the enterprise authentication server; and sending, by the network authentication server, notification information to a media plane device, wherein the notification information indicates the media plane device or an application server to typeset the target data to generate typeset target data and send the typeset target data to the called device.

8. The method according to claim 1, wherein the registration authentication success indication comprises a third user identity, and the method further comprises:

determining, by the network authentication server, that authentication of the registration authentication identifier succeeds when determining that the first user identity is the same as the third user identity.

9. The method according to claim 1, wherein sending, by the network authentication server, the target data to the called device comprises:

determining, by the network authentication server, that the target data is the initial data in response to the network authentication server determining that the call authentication identifier is the same as the registration authentication identifier.

10. The method according to claim 1, wherein sending, by the network authentication server, the target data to the called device comprises:

receiving, by the network authentication server, the target data from the enterprise authentication server in response to the network authentication server determining that the call authentication identifier is different from the registration authentication identifier, wherein the target data and the initial data are different from each other.

11. The method according to claim 1, further comprising:

receiving, by the network authentication server, a first certificate authority (CA) certificate corresponding to a device certificate of the enterprise authentication server; and creating, by the network authentication server in accordance with the first CA certificate, a transport layer security (TLS) protocol secure connection between the network authentication server and the enterprise authentication server, and performing, by the network authentication server, data exchange with the enterprise authentication server through the TLS protocol secure connection.

12. A method, comprising:

receiving, by an enterprise authentication server, a call authentication request from a network authentication server, wherein the call authentication request comprises a call authentication identifier; and in response to the enterprise authentication server determining, based on the call authentication identifier, that authentication succeeds, sending, by the enterprise authentication server, a call authentication success indication and target data to the network authentication server, wherein the call authentication success indication indicates that authentication of the call authentication identifier succeeds, and the target data comprises identity information of a calling user or information of an enterprise to which the calling user belongs;

wherein before receiving, by the enterprise authentication server, the call authentication request from the network authentication server, the method further comprises:

receiving, by the enterprise authentication server, an authentication request from the network authentication server, wherein the authentication request comprises a registration authentication identifier; and in response to the enterprise authentication server determining, based on the registration authentication identifier, that authentication of the registration authentication identifier succeeds, sending, by the enterprise authentication server, a registration authentication success indication and initial data to the network authentication server, wherein the registration authentication success indication indicates that authentication of the registration authentication identifier succeeds, and the initial data comprises the identity information of the calling user or the information of the enterprise to which the calling user belongs.

13. The method according to claim 12, wherein the enterprise authentication server sends the target data to the network authentication server in response to the call authentication identifier being different from the registration authentication identifier, wherein the target data and the initial data are different from each other.

14. The method according to claim 12, wherein before receiving, by the enterprise authentication server, the authentication request from the network authentication server, the method further comprises:

receiving, by the enterprise authentication server, a first user identity from a calling device, wherein the first user identity is an identity of the calling user; and sending, by the enterprise authentication server to the calling device, the registration authentication identifier corresponding to the first user identity.

15. The method according to claim 12, wherein the method further comprises:

receiving, by the enterprise authentication server, a second certificate authority (CA) certificate corresponding to a device certificate of the network authentication server; and creating, by the enterprise authentication server in accordance with the second CA certificate, a transport layer security (TLS) protocol secure connection between the enterprise authentication server and the network authentication server, and performing, by the enterprise authentication server, data exchange with the network authentication server through the TLS protocol secure connection.

16. The method according to claim 12, wherein after receiving, by the enterprise authentication server, the call authentication request from the network authentication server, the method further comprises:

in response to the enterprise authentication server determining, based on the call authentication identifier, that authentication fails, sending, by the enterprise authentication server, authentication invalidity notification information to the network authentication server, wherein the authentication invalidity notification information indicates that authentication fails.

17. The method according to claim 12, wherein before receiving, by the enterprise authentication server, the call authentication request from the network authentication server, the method further comprises:

receiving, by the enterprise authentication server, a first user identity from a calling device, wherein the first user identity is an identity of the calling user; and sending, by the enterprise authentication server to the calling device, the call authentication identifier corresponding to the first user identity.

18. A network authentication server, comprising:

a non-transitory computer-readable storage medium comprising instructions; and one or more processors in communication with the non-transitory computer-readable storage medium, wherein the one or more processors execute the instructions to:

receive a call request message from a calling device of a calling user, wherein the call request message comprises a first user identity of the calling user and a call authentication identifier;

send a call authentication request to an enterprise authentication server corresponding to the first user identity, wherein the call authentication request comprises the call authentication identifier;

receive a call authentication success indication corresponding to the call authentication request from the enterprise authentication server, wherein the call authentication success indication indicates that authentication of the call authentication identifier succeeds; and send target data to a called device of a called user, wherein the target data comprises identity information of the calling user or information of an enterprise to which the calling user belongs;

wherein before receiving the call request message from the calling device, the one or more processors execute the instructions to:

receive a registration request message from the calling device, wherein the registration request message comprises the first user identity and a registration authentication identifier;

send an authentication request to the enterprise authentication server corresponding to the first user identity, wherein the authentication request comprises the registration authentication identifier;

receive a registration authentication success indication corresponding to the authentication request from the enterprise authentication server, wherein the registration authentication success indication indicates that authentication of the registration authentication identifier succeeds; and obtain initial data, wherein the initial data comprises the identity information of the calling user or the information of the enterprise to which the calling user belongs.

\* \* \* \* \*